(12) United States Patent
Shepelev et al.

(10) Patent No.: US 9,740,347 B2
(45) Date of Patent: Aug. 22, 2017

(54) ACTIVE PEN SENSING FOR A DISPLAY DEVICE HAVING AN INTEGRATED SENSING DEVICE

(71) Applicant: Synaptics Incorporated, San Jose, CA (US)

(72) Inventors: Petr Shepelev, Campbell, CA (US); Oscar Ayzenberg, Cupertino, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 184 days.

(21) Appl. No.: 14/656,624

(22) Filed: Mar. 12, 2015

(65) Prior Publication Data

US 2015/0261356 A1    Sep. 17, 2015

Related U.S. Application Data

(60) Provisional application No. 61/952,837, filed on Mar. 13, 2014.

(51) Int. Cl.
*G06F 3/0354* (2013.01)
*G06F 3/044* (2006.01)
*G06F 1/32* (2006.01)
*G06F 3/041* (2006.01)

(52) U.S. Cl.
CPC ............ *G06F 3/044* (2013.01); *G06F 1/3262* (2013.01); *G06F 3/03545* (2013.01); *G06F 3/0416* (2013.01)

(58) Field of Classification Search
CPC ...... G06F 3/03545; G06F 3/044; G06F 3/046; G06F 3/041
See application file for complete search history.

(56) References Cited

U.S. PATENT DOCUMENTS

| 8,040,330 | B2 | 10/2011 | Hauck |
| 8,493,360 | B2 | 7/2013 | Kremin et al. |
| 8,797,301 | B2 | 8/2014 | Ryshtun et al. |
| 2010/0315384 | A1 | 12/2010 | Hargreaves et al. |
| 2012/0105361 | A1 | 5/2012 | Kremin et al. |
| 2012/0105362 | A1 | 5/2012 | Kremin et al. |
| 2013/0335338 | A1* | 12/2013 | Lai .......... G06F 3/044 345/173 |
| 2014/0176465 | A1* | 6/2014 | Ma .......... G06F 3/041 345/173 |

(Continued)

FOREIGN PATENT DOCUMENTS

WO    20130165466 A1    11/2013

*Primary Examiner* — Chanh Nguyen
*Assistant Examiner* — Sepehr Azari
(74) *Attorney, Agent, or Firm* — Patterson + Sheridan, LLP

(57) ABSTRACT

A processing system (and associated input device and method) is disclosed that includes a display module configured to drive a display signal onto a plurality of sensor electrodes for updating a display, and a sensor module configured to communicate with the plurality of sensor electrodes. The sensor module is configured to, in a first mode of operation, operate the plurality of sensor electrodes to receive an active input from an active input device, and in a second mode of operation, operate the plurality of sensor electrodes to receive capacitive sensing data from a passive input device. The processing system further includes a determination module configured to determine a position of the active input device based on a harmonic of the active input signal.

20 Claims, 13 Drawing Sheets

(56) References Cited

U.S. PATENT DOCUMENTS

2014/0176495 A1  6/2014 Vlasov
2015/0277601 A1* 10/2015 Tahara ................ G06F 3/03545
                                            345/173

* cited by examiner

ACTIVE PEN SENSING FOR A DISPLAY DEVICE HAVING AN INTEGRATED SENSING DEVICE

CROSS-REFERENCE TO RELATED APPLICATIONS

This application claims benefit of U.S. provisional patent application Ser. No. 61/952,837, filed Mar. 13, 2014, entitled "Active Pen Sensing for a Display Device Having an Integrated Sensing Device," which is herein incorporated by reference.

BACKGROUND

Field

Embodiments of the present disclosure generally relate to electronic devices.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY

In one embodiment, a processing system is disclosed that includes a display module configured to drive a display signal onto a plurality of sensor electrodes for updating a display, and a sensor module configured to communicate with the plurality of sensor electrodes. The sensor module is configured to, in a first mode of operation, operate the plurality of sensor electrodes to receive an active input from an active input device, and in a second mode of operation, operate the plurality of sensor electrodes to receive capacitive sensing data from a passive input device. The processing system further includes a determination module configured to determine a position of the active input device based on a harmonic of the active input signal.

In another embodiment, an input device is disclosed that includes a plurality of sensor electrodes, and a processing system coupled to the plurality of sensor electrodes. The processing system is configured to, in a first mode of operation, drive a display signal onto the plurality of sensor electrodes to update a display image, in second mode of operation, operate the plurality of sensor electrodes to receive capacitive sensing data from a passive input device, and in a third mode of operation, operate the plurality of sensor electrodes to receive an active input signal from an active input device. The processing system is further configured to determine a position of the active input device based on a harmonic of the received active input signal.

In another embodiment, a method is disclosed that includes, in a first mode of operation, driving a display signal onto a plurality of sensor electrodes to update a display image. The method further includes, in a second mode of operation, operating the plurality of sensor electrodes to receive capacitive sensing data from a passive input device. The method further includes, in a third mode of operation, operating the plurality of sensor electrodes to receive an active input signal from an active input device. The method further includes determining a position of the active input device based on a selected harmonic of the active input signal.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
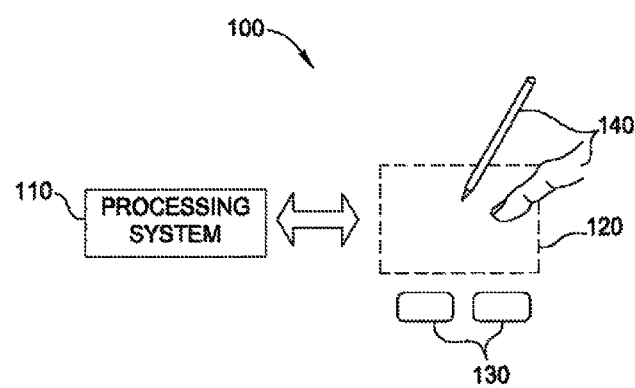
FIG. 1 is a block diagram of an exemplary input device 100, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Embodiments disclosed herein generally describe the operation of a plurality of sensor electrodes within an input device in different modes to perform display updating as well as active and passive input sensing. Specifically, the techniques described herein may be used to operationally adapt an input device that is configured for passive input sensing to also accommodate active input signals from active input devices. In other words, the operation of the input device may be modified to support active input sensing without requiring separate, dedicated hardware. The techniques may be used to increase the compatibility of input devices to accept active input signals provided by third-party or other active input devices. Similarly, the techniques may be used to perform active and passive input sensing within the same sensing frame, which may generally increase sensing performance and may also appear to be substantially simultaneous to one or more users of the input device.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IrDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
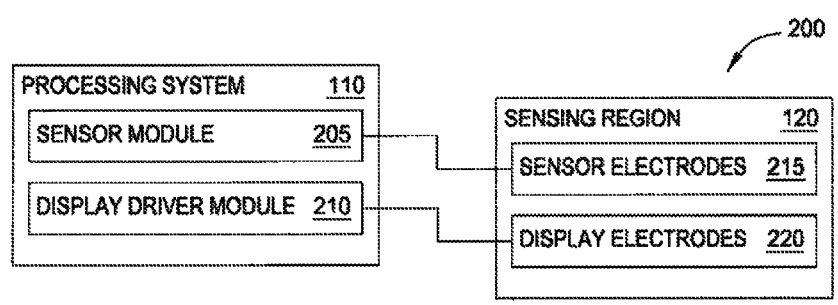
FIG. 2 is a block diagram of a processing system coupled with sensor electrodes and display electrodes, according to embodiments described herein.

FIG. 2 is a block diagram of processing system 110 coupled to sensor electrodes 215 and display electrodes 220 in accordance with an embodiment of the invention. Specifically, FIG. 2 illustrates a system 200 where processing system 110 is coupled to electrodes in the sensing region 120. The processing system 110 includes a sensor module 205 and display driver module 210. As stated above, each module may comprise circuitry that is a part of the processing system 110, firmware, software, or a combination thereof. The sensor module 205 is coupled to the sensor electrodes 215 and is used to perform capacitive sensing by driving a capacitive sensing signal onto the sensor electrodes 215 and measuring an effect caused by the capacitive sensing signal (e.g., a change in charge, current, voltage, etc.).

In one embodiment, a set of measurements from a plurality of capacitive pixels form a "capacitive image" (also "capacitive frame") representative of the capacitive couplings at the capacitive pixels. Multiple capacitive images may be acquired over multiple time periods, and differences between them used to derive information about input in the sensing region 120. For example, successive capacitive images acquired over successive periods of time can be used to track the motion(s) of one or more input objects entering, exiting, and within the sensing region 120. In one embodiment, the sensor module 205 uses sensor bursts to measure the capacitive pixels and form the capacitive image or frame. However, because interfering signals may affect the measurements acquired during the sensor bursts, the sensor module 205 uses one or more interference bursts during each capacitive frame to perform interference detection. For example, the interference bursts may be performed the beginning or end of each capacitive frame. If the sensor module 205 detects an interfering signal, the sensor module 205 may change the frequency of the sensor bursts.

The display driver module 210 is coupled to a plurality of display electrodes 220 which are used to update display lines in a display. In one embodiment, the operation of the display driver module 210 may control when the sensor module 205 performs capacitive sensing. For example, once updated display data is received, the display driver module 210 may pause capacitive sensing performed by the sensor module 205 and update the display using the received display data. Once the display is updated, the display driver module 210 may resume capacitive sensing. As such, the interference bursts may be separated from one or more of the sensor bursts in the same capacitive fame by a display update period.

The display driver module 210 may be included with or separate from the sensor module 205. In one embodiment, the processing system comprises a first integrated controller comprising the display driver module 210 and at least a portion of the sensor module 205 (i.e., transmitter module and/or receiver module). In another embodiment, the processing system comprises a first integrated controller comprising the display driver module 210 and a second integrated controller comprising the sensor module 205. In yet another embodiment, the processing system comprises a first integrated controller comprising a display driver module 210 and a first portion of the sensor module 205 (e.g., one of a transmitter module and a receiver module) and a second integrated controller comprising a second portion of the sensor module 205 (e.g., the other one of the transmitter and receiver modules).

In one embodiment, one or more of the sensor electrodes 215 include one or more display electrodes 220 used in updating the display. That is, instead of the sensor electrodes 215 being separate from the display electrodes 220 as shown, a shared or common electrode may be used to perform both capacitive sensing and display updating. In one or more embodiment, the common electrodes may comprise one or more segments of a Vcom electrode, a source drive line, gate line, an anode electrode or cathode electrode, or any other display element. Because the common electrodes may be used both when performing capacitive sensing and when updating the display, in one embodiment, the processing system 110 may perform capacitive sensing and display updating during non-overlapping time periods. In other embodiments, processing system 110 may perform capacitive sensing and display updating during overlapping time periods. Further, in some embodiments, capacitive sensing and display updating may occur with any combination of non-overlapping and overlapping time periods. The common electrodes may be disposed on a transparent substrate (a glass substrate, TFT glass, or any other transparent material) in some display screens (e.g., In-Plane Switching (IPS) or Plane-to-Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the common electrode can also be referred to as a "combination electrode," since it performs multiple functions. In various embodiments, each of the sensor electrodes 215 comprises one or more common electrodes. In other embodiments, at least two sensor electrodes 215 may share at least one common electrode.

Exemplary Hardware Implementations

Figure 3:
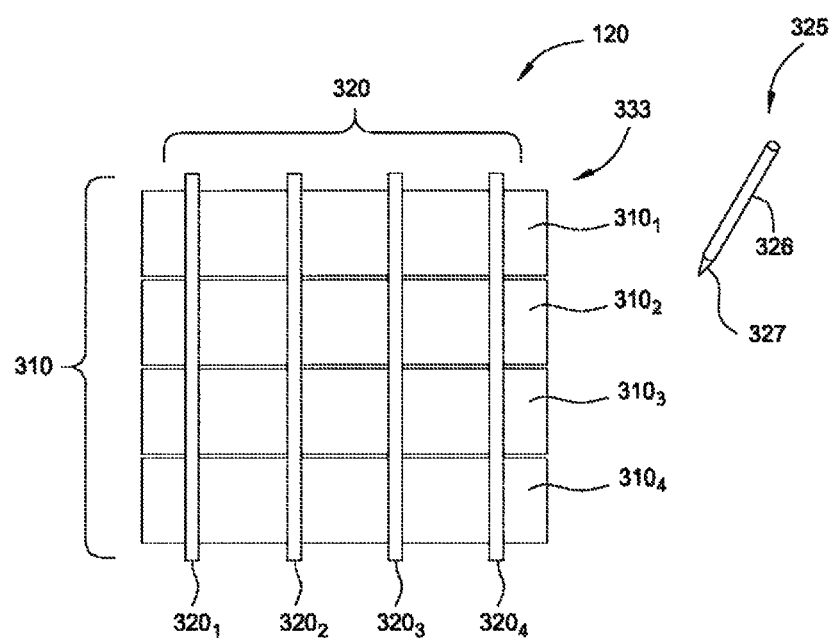
FIGS. 3 and 4 illustrate a portions of exemplary patterns of sensing elements configured to sense in a sensing region associated with the pattern, according to embodiments described herein.

FIG. 3 illustrates a portion of an exemplary pattern of sensing elements configured to sense in a sensing region 120 associated with the pattern, according to some embodiments. For clarity of illustration and description, FIG. 3 shows the sensing elements 333 in a pattern of simple rectangles, and does not show various components. This pattern of sensing elements 333 comprises a first plurality of sensor electrodes 310 ($310_1$, $310_2$, $310_3$, ..., $310_m$), and a second plurality of sensor electrodes 320 ($320_1$, $320_2$, $320_3$, ..., $320_n$) disposed over the plurality of transmitter electrodes 310. In various embodiments, processing system 110 may be configured to drive the first plurality of sensor electrodes 310 with transmitter signals and receive resulting signals with the second plurality of sensor electrodes. In such embodiments, the first plurality of sensor electrodes 310 may be referred to as "transmitter electrodes" and the second plurality of sensor electrodes may be referred to as "receiver electrodes." In another embodiment, the first plurality of sensor electrodes 310 may be configured to transmit and receive and the second plurality of sensor electrodes 320 may also be configured to transmit and receive. In some embodiments, the first plurality of sensor electrodes 310 and/or the second plurality of sensor electrodes 320 may be further configured to perform absolute capacitive sensing.

The first plurality of sensor electrodes 310 and the second plurality of sensor electrodes 320 are typically ohmically isolated from each other. That is, one or more insulators separate the first plurality of sensor electrodes 310 and the second plurality of sensor electrodes 320 and prevent them from electrically shorting to each other. In some embodiments, the first plurality of sensor electrodes 310 and second plurality of sensor electrodes 320 are separated by insulative material disposed between them at cross-over areas; in such constructions, the first plurality of sensor electrodes 310 and/or the second plurality of sensor electrodes 320 may be formed with jumpers connecting different portions of the same electrode. In some embodiments, the first plurality of sensor electrodes 310 and second plurality of sensor electrodes 320 are separated by one or more layers of insulative material. In such embodiments, the transmitter electrodes and receiver electrodes may be disposed on separate layers of a common substrate. In some other embodiments, the first plurality of sensor electrodes 310 and the second plurality of sensor electrodes 320 are separated by one or more substrates; for example, they may be disposed on opposite sides of the same substrate, or on different substrates that are laminated together. In some embodiments, the first plurality of sensor electrodes 310 and the second plurality of sensor electrodes 320 are disposed on the same layer of a common substrate in a non-overlapping arrangement.

The areas of localized capacitive coupling between the first plurality of sensor electrodes 310 and the second plurality of sensor electrodes 320 may be termed "capacitive pixels." The capacitive coupling between the first plurality of sensor electrodes 310 and the second plurality of sensor electrodes 320 change with the proximity and motion of input objects in the sensing region associated with the first plurality of sensor electrodes 310 and the second plurality of sensor electrodes 320.

In some embodiments, the sensor pattern is "scanned" to determine these capacitive couplings. That is, the first plurality of sensor electrodes 310 are operated as transmitter electrodes and driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of sensor electrodes 320 to be independently determined.

The second plurality of sensor electrodes 320 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The baseline capacitance of a sensor device is the capacitive image associated with no input object in the sensing region. The baseline capacitance changes with the environment and operating conditions, and may be estimated in various ways. For example, some embodiments take "baseline images" when no input object is determined to be in the sensing region, and use those baseline images as estimates of their baseline capacitances.

Capacitive images can be adjusted for the baseline capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, sensor electrodes 310 comprise one or more display electrodes (e.g., a segment of a segmented "Vcom" electrode, gate electrode, source driver electrode, anode electrode, or cathode electrode) used in updating the display of the display screen. These common electrodes may be disposed on an appropriate display screen substrate. For example, the common electrodes may be disposed on a transparent substrate (a glass substrate, TFT glass, or any other transparent material) in some display screens (e.g., In-Plane Switching (IPS) or Plane-to-Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The common electrode can also be referred to as a "combination electrode" since it performs multiple functions. In various embodiments, each sensor electrode 310 comprises one or more combination electrodes. In other embodiments, at least two sensor electrodes 310 may share at least one combination electrode. Furthermore, in one embodiment both the sensor electrodes 310 and the sensor electrodes 320 are both disposed within a display stack on the display screen substrate. Additionally, at least one of the sensor electrodes 310, 320 in the display stack may comprise a combination electrode. However, in other embodiments, only the sensor electrodes 310 or sensor electrodes 320 (but not both) are disposed within the display stack while other sensor electrodes are outside of the display stack (e.g., disposed on an opposite side of a color filter glass).

In various touch screen embodiments, the "capacitive frame rate" (the rate at which successive capacitive images are acquired) may be the same or may differ from that of the "display frame rate" (i.e., the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the baseline capacitive image. In various embodiments, the display updating effect may be due to a change in capacitance or a change in injected charge while changes in capacitance are measured. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes). In various embodiments, the capacitive frame rate is an integer multiple of the display frame rate. For example, for a display frame rate of 60 Hertz (Hz), the capacitive frame rate may be any one of 120 Hz, 180 Hz, 240 Hz, etc. However, other display frame rates and capacitive frame rates are possible. In other embodiments, the capacitive frame rate is a fractional multiple of the display frame rate. For example, for a display frame rate of 60 Hz, the capacitive frame rate may be 90 Hz. However, other display frame rates and capacitive frame rates are possible. In yet further embodiments, the capacitive frame rate may be any fraction or integer of the display frame rate. For example, for a display frame rate of 48 Hz, the capacitive frame rate may be 100 Hz. However, other display frame rates and capacitive frame rates are possible.

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats. In some embodiments, there may be "n" capacitive images for every display updating state.

As defined herein, an active input device provides input by emitting one or more electrical signals that are capable of being detected within a sensing region of an input device (e.g., sensing region 120 of input device 100). Some non-limiting examples of active input devices include powered pens or styli, but other suitable form factors and arrangements may be used. An active input device generally includes a power source (such as a battery) and powered circuitry.

FIG. 3 illustrates an active input device 325 disposed near the sensing elements 333. As shown, active input device 325 is depicted as an active pen, which includes circuitry within a housing 326 and which transmits input signals through a pen tip 327, which in some implementations may be conductive. Signals that are generated by the active input device 325 may be coupled into one or more of the sensing elements 333 and provide information to the processing system 110. Some examples of information may include positional data, the operational state of various components of the active input device (e.g., a force applied on pen tip 327, whether buttons formed in housing 326 are depressed), battery data, device identification data, and so forth. In some embodiments, the signals may be provided in the form of a square wave; however, any suitable alternative signal waveforms are possible.

Figure 4:
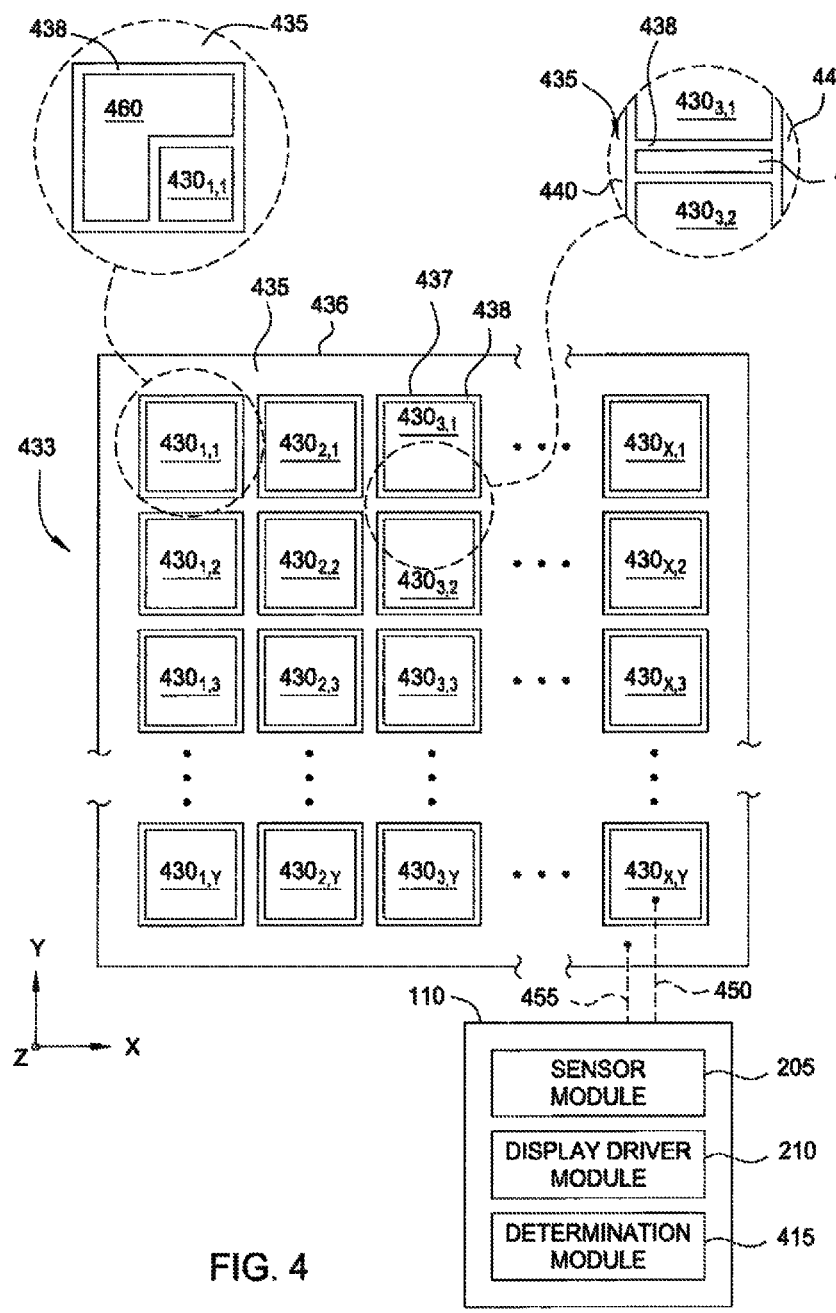

FIG. 4 shows a portion of an exemplary pattern of sensing elements 333 configured to sense in the sensing region 120 associated with the pattern, according to some embodiments. For clarity of illustration and description, FIG. 4 shows the sensor electrodes 430 of the sensing elements 433 in a pattern of simple rectangles with a grid electrode 435 disposed therebetween, and does not show various other components. The exemplary pattern of sensing elements 433 comprises an array of sensor electrodes $430_{X,Y}$ (referred to collectively as sensor electrodes 430) arranged in X columns and Y rows, wherein X and Y are positive integers, although one of X and Y may be zero. It is contemplated that the pattern of sensing elements 433 may comprises a plurality of sensor electrodes 430 having other configurations, such as polar arrays, repeating patters, non-repeating patterns, a single row or column, or other suitable arrangement. Further, in various embodiments the number of sensor electrodes may vary from row to row and/or column to column. In one embodiment, at least one row and/or column of sensor electrodes 430 is offset from the others, such it extends further in at least one direction than the others. The sensor electrodes 430 and grid electrodes 435 are coupled to the processing system 110 and utilized to determine the presence (or lack thereof) of an input object 140 in the sensing region 120.

In a first mode of operation, the arrangement of sensor electrodes 430 may be utilized to detect the presence of an input object via absolute sensing techniques. That is, processing system 110 is configured to modulate sensor electrodes 430 to acquire measurements of changes in capacitive coupling between the modulated sensor electrodes 430 and an input object to determine the position of the input object. Processing system 110 is further configured to determine changes of absolute capacitance based on a measurement of resulting signals received with sensor electrodes 430 which are modulated.

The sensor electrodes 430 are typically ohmically isolated from each other, and also ohmically isolated from the grid electrode 435. That is, one or more insulators separate the sensor electrodes 430 (and grid electrode 435) and prevent them from electrically shorting to each other. In some embodiments, the sensor electrodes 430 and grid electrode 435 are separated by insulative gap 438. The insulative gap 438 separating the sensor electrodes 430 and grid electrode 435 may be filled with an electrically insulating material, or may be an air gap. In some embodiments, the sensor electrodes 430 and the grid electrode 435 are vertically separated by one or more layers of insulative material. In some other embodiments, the sensor electrodes 430 and the grid electrode 435 are separated by one or more substrates; for example, they may be disposed on opposite sides of the same substrate, or on different substrates. In yet other embodiments, the grid electrode 435 may be composed of multiple layers on the same substrate, or on different substrates. In one embodiment, a first grid electrode may be formed on a first substrate or first side of a substrate and a second grid electrode may be formed on a second substrate or a second side of a substrate. For example, a first grid comprises one or more common electrodes disposed on a TFT layer of a display device and a second grid electrode is disposed on the color filter glass of the display device. In one embodiment, the dimensions of the first grid electrode are equal to the dimensions of the second grid electrode. In one embodiment, at least one dimension of the first grid electrode differs from a dimension of the second grid electrode. For example, the first grid electrode may be configured such that is disposed between a first and second sensor electrode 430 and the second grid electrode may be configured such that it overlaps at least one of the first and second sensor electrodes 430 and the first grid electrode. Further, the first grid electrode may be configured such that it is disposed between a first and second sensor electrode 430 and the second grid electrode may be configured such that it only overlaps the first grid electrode and is smaller than the first grid electrode.

In a second mode of operation, the sensor electrodes 430 may be utilized to detect the presence of an input object via transcapacitive sensing techniques when a transmitter signal is driven onto the grid electrode 435. That is, processing system 110 is configured drive the grid electrode 435 with a transmitter signal and receive resulting signals with each sensor electrode 430, where a resulting signal comprising effects corresponding to the transmitter signal, which is utilized by the processing system 110 or other processor to determine the position of the input object.

In a third mode of operation, the sensor electrodes 430 may be split into groups of transmitter and receiver electrodes utilized to detect the presence of an input object via transcapacitive sensing techniques. That is, processing system 110 may drive a first group of sensor electrodes 430 with a transmitter signal and receive resulting signals with the second group of sensor electrodes 430, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to operate switch between any two or more of the modes described above.

The areas of localized capacitive sensing of capacitive couplings may be termed "capacitive pixels." Capacitive pixels may be formed between an individual sensor electrode 430 and a reference voltage in the first mode of operation, between the sensor electrodes 430 and a grid electrode 435 in the second mode of operation, and between groups of sensor electrodes 430 used as transmitter and receiver electrodes. The capacitive coupling changes with the proximity and motion of input objects 140 in the sensing region 120 associated with the sensing elements 433, and thus may be used as an indicator of the presence of the input object in the sensing region of the input device 100.

In some embodiments, the sensor electrodes 430 are "scanned" to determine these capacitive couplings. That is, in one embodiment, one or more of the sensor electrodes 430 are driven to transmit a transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes are received with using a scanning scheme.

The sensor electrodes 430 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 430 in a scanning fashion and/or a multiplexed fashion to reduce the number of simultaneous measurements to be made as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode with a transmitter or other signal and/or voltage potential. In one embodiment, the switching element may be configured to couple more than one receiver electrode to a common receiver at the same time.

In other embodiments, "scanning" sensor electrodes 430 to determine these capacitive coupling comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 430 simultaneously. In one embodiment each of the sensor electrodes 430 are simultaneously driven and received with, obtaining an absolute capacitive measurement simultaneously from each of the sensor electrodes 430. In various embodiments, processing system 110 may configured to selectively modulate a portion of sensor electrodes 430. For example, the sensor electrodes may be selected based on, but not limited to, an application running on the host processor, a status of the input device, and an operating mode of the sensing device. In various embodiments, processing system 110 may be configured to selectively shield at least portion of sensor electrodes 430 and to selectively shield or transmit with the grid electrode(s) 435 while selectively receiving and/or transmitting with other sensor electrodes 430.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 430 may be ganged together such that the sensor electrodes 430 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to "wake up" the processing system 110 or input device 100—that is, to transition the processing system 110 or the input device 100 out of a "doze" or low power mode of operation. In one embodiment, the coarse capacitive image may be used to transition a capacitive sensor integrated circuit out of a doze mode or low power mode. In another embodiment, the coarse capacitive image may be used to transition a host integrated circuit out of a doze mode or low power mode. The coarse capacitive image may correspond to the entire sensor area or only to a portion of the sensor area. In some embodiments, the grid electrode(s) 435 may be used separate from, or in conjunction with, the sensor electrodes 430 for producing the coarse capacitive image. Further, the grid electrode(s) 435 may be used to determine an absolute capacitive sensing profile along a particular axis or dimension, such as an x-axis or a y-axis.

The background capacitance of the input device 100 represents the capacitive image associated with no input object in the sensing region 120. The background capacitance changes with the environment and operating conditions, and may be estimated in various ways. For example, some embodiments take "baseline images" when no input object is determined to be in the sensing region 120, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground or from stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 430 comprise one or more display electrodes used in updating the display of the display screen. The display electrodes may comprise one or more elements of the Active Matrix display such as one or more segments of a segmented Vcom electrode (common electrode(s)), a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane-to-Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode", since it performs multiple functions. In various embodiments, each of the sensor electrodes 430 comprises one or more common electrodes. In other embodiments, at least two sensor electrodes 430 may share at least one common electrode. While the following description may describe that sensor electrodes 430 and/or grid electrode 435 comprise one or more common electrodes, various other display electrodes as describe above may also be used in conjunction with the common electrode or as an alternative to the common electrodes. In various embodiments, the sensor electrodes 430 and grid electrode 435 comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 4, the processing system 110 coupled to the sensor electrodes 430 includes a sensor module 205 and optionally, a display driver module 210. The sensor module 205 includes circuitry configured to drive at least one of the sensor electrodes 430 for capacitive sensing during periods in which input sensing is desired. In one embodiment, the sensor module is configured to drive a modulated signal onto the at least one sensor electrode to detect changes in absolute capacitance between the at least one sensor electrode and an input object. In another embodiment, the sensor module is configured to drive a transmitter signal onto the at least one sensor electrode to detect changes in a transcapacitance between the at least one sensor electrode and another sensor electrode. The modulated and transmitter signals are generally varying voltage signals comprising a plurality of voltage transitions over a period of time allocated for input sensing. In various embodiments, the sensor electrodes 430 and/or grid electrode 435 may be driven differently in different modes of operation. In one embodiment, the sensor electrodes 430 and/or grid electrode 435 may be driven with signals (modulated signals, transmitter signals and/or shield signals) that may differ in any one of phase, amplitude and/or shape. In various embodiments, three modulated signal and transmitter signal are similar in at least one shape, frequency, amplitude and/or phase. In other embodiments, the modulated signal and the transmitter signals are different in frequency, shape, phase, amplitude and phase. The sensor module 205 may be selectively coupled one or more of the sensor electrodes 430 and/or the grid electrode 335. For example, the sensor module 205 may be coupled selected portions of the sensor electrodes 430 and operate in either an absolute or transcapacitive sensing mode. In another example, the sensor module 205 may be a different portion of the sensor electrodes 430 and operate in either an absolute or transcapacitive sensing mode. In yet another example, the sensor module 205 may be coupled to all the sensor electrodes 430 and operate in either an absolute or transcapacitive sensing mode. The sensor module 205 is also configured to operate the grid electrode 435 as a shield electrode. Processing system 110 is configured to operate the grid electrode 435 as a shield electrode that may shield sensor electrodes 430 from the electrical effects of nearby conductors. In one embodiment, processing system is configured to operate the grid electrode 435 as a shield electrode that may shield sensor electrodes 430 from the electrical effects of nearby conductors and guard the sensor electrodes 430 from grid electrode 435, at least partially reducing the parasitic capacitance between the grid electrode 435 and the sensor electrodes 430. In one embodiment, a shielding signal is driven onto the grid electrode 435. The shielding signal may be a ground signal, such as the system ground or other ground, or any other constant voltage (i.e., non-modulated) signal. In another embodiment, operating the grid electrode 435 as a shield electrode may comprise electrically floating the grid electrode. In embodiment, grid electrode 435 is able to operate as an effective shield electrode while being electrode floated due to its large coupling to the other sensor electrodes. In other embodiment, the shielding signal may be referred to as a guarding signal where the guarding signal is a varying voltage signal having at least one of a similar phase, frequency and amplitude as the modulated signal driven on to the sensor electrodes. In one or more embodiment, routing (e.g., traces 450 and/or 455) may be shielded from responding to an input object due to routing beneath the grid electrode 435 and/or sensor electrodes 430, and therefore may not be part of the active sensor electrodes, shown as sensor electrodes 430.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period, where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 330. In other embodiments, the non-display update period may comprise horizontal blanking periods and vertical blanking periods. Processing system 110 may be configured to drive sensor electrodes 430 for capacitive sensing during any one or more of or any combination of the different non-display update times. Synchronization signals may be shared between sensor module 205 and display driver module 210 to provide accurate control of overlapping display updating and capacitive sensing periods with repeatable coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 205 includes circuitry configured to receive resulting signals with the sensing elements 433 comprising effects corresponding to the modulated signals or the transmitter signals during periods in which input sensing is desired. The sensor module 205 may determine a position of the input object 140 in the sensing region 120 or may provide a signal including information indicative of the resulting signal to another module or processor, for example, a determination module 415 or a processor of the electronic device (i.e., a host processor), for determining the position of the input object 140 in the sensing region 120.

The determination module 415 may be configured to perform various calculations to determine the positional information of an input object in the sensing region 120. The determination module 415 may optionally be part of a host processor of the electronic system.

As discussed above, the sensor electrodes 430 of the sensing elements 333 may be formed as discrete geometric forms, polygons, bars, pads, lines or other shape, which are ohmically isolated from one another. In various embodiments, ohmically isolated comprises passively isolated, where active switches may be configured to couple different sensor electrodes to the same signal during a period of time. The sensor electrodes 430 may be electrically coupled through circuitry to form electrodes of having larger plan area relative to a discrete one of the sensor electrodes 430. The sensor electrodes 430 may be fabricated from opaque or non-opaque conductive materials, or the combination of the two. In embodiments wherein the sensor electrodes 430 are utilized with a display device, it may be desirable to utilize non-opaque conductive materials for the sensor electrodes 430. In embodiments wherein the sensor electrodes 430 are not utilized with a display device, it may be desirable to utilize opaque conductive materials having lower resistivity for the sensor electrodes 430 to improve sensor performance. Materials suitable for fabricating the sensor electrodes 430 include ITO, aluminum, silver, copper, molybdenum and conductive carbon materials, among others and various sensor electrodes may be formed of a deposited stack of different conductive materials. The sensor electrodes 430 may be formed as contiguous body of conductive material having little or no open area (i.e., having a planar surface uninterrupted by holes), or may alternatively be fabricated to form a body of material having openings formed therethrough. For example, the sensor electrodes 430 may be formed from a mesh of conductive material, such as a plurality of interconnected thin metal wires. In one embodiment, at least one of the length and width of the sensor electrodes 430 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, in various embodiments, the sensor electrodes 430 may comprise a center to center pitch in the range of about 4 to about 5 mm; however, in other embodiments, the pitch may be less than about 4 mm or greater than about 5 mm.

The grid electrode 435 may be fabricated similar to the sensor electrodes 330. The sensor electrodes 430 and the grid electrode 435 may be coupled to the processing system 110 utilizing conductive traces 450, 455 (shown in phantom). The conductive traces 450, 455 may be formed in the same plane at least one of the sensor electrodes 430 and the grid electrode 435, or may be formed on one or more separate substrates and connected to the respective electrodes 430, 435 by vias (not shown). Conductive traces 450, 455 may be formed on a metal layer disposed such that the sensor electrodes 430 are between the metal layer and the input object. In one embodiment the metal layer comprises source driver lines and/or gate lines for a display device. The conductive traces 450, 455 and vias between them may be obscured from a user by a black mask layer disposed between them and the user of the display device. At least one of the conductive traces 450, 455 may comprise one or more routing traces (conductors) in the source driver metal layer. In one or more embodiments such a layer may be referred to as metal interconnect layer two. Further, conductive traces 450 and/or 455 may be disposed on a metal layer between source driver lines. Alternately, at least one of the conductive traces 450, 455 may comprise one or more conductors in the gate driver metal layer or gate driver lines not configured for display updating. Further, conductive traces 450 and/or 455 may be disposed on a metal layer between gate driver lines. In another embodiment, at least one of the conductive traces 450, 455 may comprise one or more conductors in the Vcom jumper metal layer or Vcom lines not otherwise configured for display updating. Further, conductive traces 450 and/or 455 may be disposed on a metal layer between gate electrodes. In other embodiments the metal layer is included in addition to a layer comprising the source driver lines and/or gate lines. A portion of the conductive traces 450, 455 may also be formed laterally outward of the areal bounds of the sensing elements 433. In various embodiments, the conductive traces 450 and/or 455 may be disposed in a Vcom electrode jumper layer. The Vcom electrode jumper layer may be referred to as metal layer three or a metal interconnect layer three. In one embodiment, conductive traces may be disposed on both a source drive layer and a Vcom electrode jumper layer. In various embodiments, the display device may comprise a "dual gate" or half source driver" configuration, allowing conductive routing traces 450 and/or 455 to be disposed between source drivers on the source driver layer. In one or more embodiments, orthogonal directions of connections between the conductive traces 450, 455 they may be placed on separate layers, with vias between them.

The grid electrode 435 is disposed between at least two of the sensor electrodes 430. The grid electrode 435 may at least partially circumscribe the plurality of sensor electrodes 430 as a group, and may also, or in the alternative, completely or partially circumscribe one or more of the sensor electrodes 430. In one embodiment, the grid electrode 435 is a planar body 436 having a plurality of apertures 437, each aperture 437 circumscribing a respective one of the sensor electrodes 430. Accordingly, the grid electrode 435 separates and circumscribes at least three or more of sensor electrodes 430, and in this example, separates and circumscribes all of sensor electrodes 430. The gap 438 spaces the body 436 from the sensor electrode 430 disposed in the aperture 437. In one or more embodiments, the grid electrode 435 is configured to substantially fill the space defined by the gap 438. In one embodiment a second grid electrode may be disposed on a substrate between grid electrode 435 and a touch input layer. The second grid electrode may be the same size as grid electrode 435, or larger than grid electrode 435 such that is overlaps one more sensor electrodes 430 and grid electrode or smaller than grid electrode 435 such that it overlaps a portion of the grid electrode 435. In various embodiments, the grid electrode 435 is disposed between at least two of sensor electrodes 430 such that the grid electrode 435 is on different layer (i.e., different substrate or side of the same substrate) and overlaps a portion of at least two sensor electrodes and the gap between the sensor electrodes. In the embodiments where the sensor electrodes 430 comprise one or more common electrodes, the sensor electrodes may comprise the entirety of the common electrode layer.

The grid electrode 435 may also be segmented. The segmentation of the grid electrode 435 may allow individual segments of the grid electrode 435 be less visible. The segments may be interconnected using traces or vias, so that the all the segments of the grid electrode 435 may be driven simultaneously with a common signal. Alternatively, one or more of the segments of the grid electrode 435 may be driven independently to facilitate scanning of the sensor electrodes 430 when configured as receiver electrodes in certain modes of operation as discussed further below.

As shown in the enlargement of FIG. 4, the grid electrode 435 may include a first segment 440, a second segment 442, and a third segment 444. The first and second segments 440, 442 are offset from each other and sandwich a column of sensor electrodes, shown as sensor electrodes $430_{3,1}$, $430_{3,2}$. Although not shown in the enlargement, the first segment 440 also separates the column of sensor electrodes $430_{3,Y}$ from sensor electrode $430_{2,Y}$ while the second segment 442 separates the column of sensor electrodes $430_{3,Y}$ from another column of sensor electrodes $430_{4,Y}$ (not shown). The third segment 444 is disposed between neighboring sensor electrodes 430 within a column, shown as sensor electrodes $430_{3,1}$, $430_{3,2}$. Two or more of the segments 440, 442, 444 may be independently driven, for example as transmitter electrodes.

Figure 5:
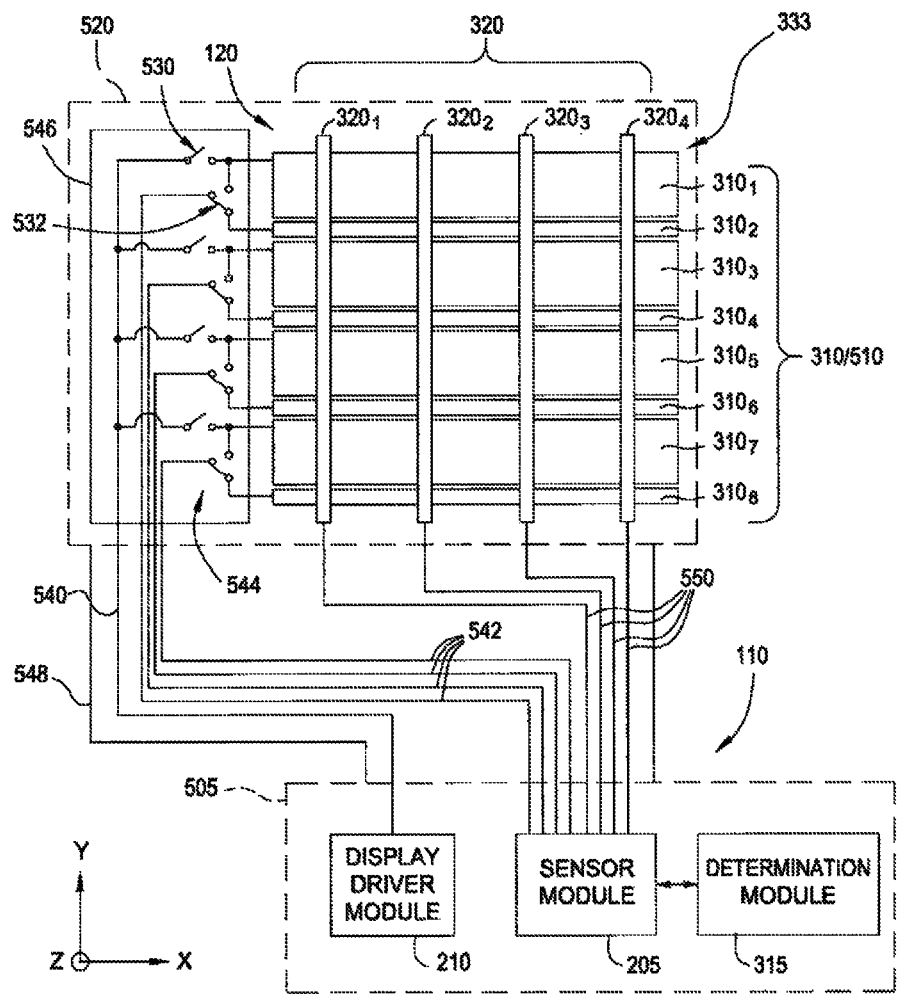
FIG. 5 illustrates an exemplary pattern for sensor electrodes that may be used to sense the positional information of an active input object within a sensing region, according to embodiments described herein.

FIG. 5 is a simplified exemplary array of sensing elements 433 coupled with the processing system 110 of the input device 100 of FIG. 1, and illustrates an exemplary pattern for the sensor electrodes 510, 320 that may be used to sense the positional information of an input object within the sensing region 120. Generally, FIG. 5 represents an adaptation of FIG. 3 that is capable of performing active input sensing. The array of sensing elements 133 are selectively coupled with components of the processing system 110, such as a display driver module 210, a sensor module 205, and a determination module 415. For clarity of illustration and description, FIG. 5 illustrates the pattern of the sensing elements 433 as rectangular bars arranged in columns and rows, and does not show all of the interconnecting features and/or other related components. While FIG. 5 illustrates the sensor electrode pattern as a pattern of simple columns and rows that are orthogonal, this is not meant to be limiting and in other embodiments, various numbers, orientations and shapes for the sensing elements 433 may be utilized.

The pattern of the sensing elements 433 may include a plurality of transmitter electrodes 310 (also described here as "electrode segments" included in a larger transmitter electrode(s) 510) and a plurality of receiver electrodes 320. The transmitter electrodes 510 may be used to update parts of a display and for capacitive sensing, and thus are referred to herein as "common electrodes," and the receiver electrodes 320 are configured to receive the resulting capacitive sensing signal(s) delivered through the common electrode(s), and thus are referred to herein as "receiver electrodes". The transmitter electrodes 510 may be comprised of a plurality of electrode segments 310 (e.g., transmitter electrode segments $310_1$-$310_8$). The transmitter electrode segments 310 may be selectively coupled together internally or externally from processing system 110 when driven as a single transmitter electrode 510. In one embodiment, one or more multiplexers may be used to couple the processing system 110 with the transmitter electrodes 510.

In some embodiments, the transmitter electrodes 510 (and/or electrode segments 310) and the receiver electrodes 320 may be similar in size and/or shape. In other embodiments, transmitter electrodes 510 and receiver electrodes 320 may have different sizes and/or shapes. In the embodiment depicted in FIG. 5, the transmitter electrodes 510 are arranged in rows while the receiver electrodes 320 are arranged in columns. The orientation between the rows of transmitter electrodes 510 and the columns of receiver electrodes 320 is shown as orthogonal in FIG. 5 without limitation, and in other embodiments, various numbers, orientations, and shapes for the transmitter electrodes 510 and the receiver electrodes 320 comprising an array of sensing elements 433 may be utilized.

In one embodiment, each of the first and second transmitter electrode segments $310_1$, $310_2$ is selectively driven by processing system 110. In one embodiment, processing system 110 drives the transmitter electrode segments $310_1$, $310_2$ as a first transmitter electrode $510_1$ for transcapacitive sensing. In such an embodiment, the transmitter electrode segments $310_1$, $310_2$ may be coupled together internally or externally from processing system 110 when they are driven as a transmitter electrode 510. Further, the transmitter electrode segments $310_1$, $310_2$ may be simultaneously driven with the same signal, forming the first transmitter electrode $510_1$. Processing system 110 may be further configured to drive one of the transmitter electrode segments $310_1$, $310_2$ for absolute capacitance sensing. In one embodiment, the first transmitter electrode segment $310_1$ may be electrically floated, driven with a guard signal, or coupled to a substantially constant voltage while the second transmitter electrode segment $310_2$ is driven for absolute capacitance sensing; driving and receiving with the second transmitter electrode segment $310_2$ to determine a change in capacitance between the second transmitter electrode segment $310_2$ and an input object in an absolute capacitance sensing mode.

While transmitter electrode segments $310_1$, $310_2$ may be driven as a transmitter electrode 510, in another embodiment, the first transmitter electrode segment $310_1$ may be driven as a receiver electrode for a transcapacitive sensor and the second transmitter electrode segment $310_2$ may be driven as an absolute capacitive sensor. For example, processing system 110 is configured to receive resulting signals with the first transmitter electrode segment $310_1$ while transmitting transmitter signals with another sensor electrode (transmitter electrode) and drive and receive with the second transmitter electrode segment $310_2$ to determine a change in absolute capacitance. In one embodiment, processing system 110 is configured to receive resulting signals with the first and second transmitter electrode segments $310_1$, $310_2$ while transmitting transmitter signals with another sensor electrode(s) (transmitter electrodes 510) and drive and receive with the second sensor electrode to determine changes in absolute capacitance.

While not illustrated in any of the above embodiments, one or more floating electrodes may be disposed above any of the sensing elements 433. The floating electrodes may be patterned such that one or more floating electrodes at least partially overlap the region of intersection of each pair of transmitter and receiver electrodes 510, 320. In one embodiment, each floating electrode may have one or more apertures. Further, the floating electrodes may have various sizes and shapes.

In one embodiment, gate-in-panel logic (GIP) logic 544 is provided to couple selected segments 310 of the transmitter electrodes 510 to either the display driver module 210 or the sensor module 205 depending on the type of capacitive sensing being performed by the input device 100. In other embodiments, the selected segments 310 of the transmitter electrodes 510 may be selectively coupled using other devices internal or external to the processing system 110. The GIP logic 544 is also configured to couple the display driver module 210 to the common electrodes which comprise one or more of the transmitter electrodes 510 to enable updating of display images. The GIP logic 544 includes circuitry, some or all which may be formed in a switch integrated circuit (switch IC) 546 formed on the substrate 520 shared with one or more of the sensor electrodes 320, 510. The switch IC 546 containing some or all of the circuitry of the GIP logic 544 may alternatively be formed on a flextail 548 routed between the sensor electrodes 320, 510 and the processing system 110 or other suitable location. Conductors 540, 542 are routed through the flextail 548 to provide communication between the transmitter electrodes 510 and the display driver module 210 and sensor module 205 of the processing system 110. Conductors 550 are also routed through the flextail 548 to provide communication between the receiver electrodes 320 and the sensor module 205 of the processing system 110.

The GIP logic 544 includes a plurality of display driver coupling (DDC) switches 530 and a plurality of transmitter electrode segmenting (TES) switches 532. In one or more embodiments, the GIP logic 544 may comprise a clock to select the transmitter electrodes 510 utilized for transcapacitive sensing routines and a separate clock to select the segments 310 of the transmitter electrodes 510 utilized for absolute sensing routines. In one or more embodiments, the GIP logic 544 may comprise a single clock to select the transmitter electrodes 510 utilized for transcapacitive sensing routines and to select the segments 310 of the transmitter electrodes 510 utilized for absolute sensing routines. In a transcapacitive sensing mode of operation, the switches 530, 532 may be controlled, closed one switch at a time or multiple switches at a time, such that the switches are closed according to the transcapacitive driving sequence. In an absolute sensing mode of operation, the switches 530, 532 may be controlled, closed one switch at a time or multiple switches at a time, such that the switches are closed according to the absolute driving sequence.

Each DDC switch 530 has at least a first state and a second state. The first state of the DDC switch 530 is operable to couple the conductor 540 to at least one of the transmitter electrodes segments 310 comprising one of the transmitter electrodes 510. The second state of the DDC switch 530 is operable to decouple the connection (i.e., open) between conductor 540 and the transmitter electrodes segments 310. For example in the first state, the DDC switch 530 couples the transmitter electrode segment $310_1$ of the first transmitter electrode $510_1$ to the display driver module 210 through the conductor 540, while in the second state, the DDC switch 530 opens (disconnects) the connection between the display driver module 210 and the transmitter electrodes 510.

The TES switch 532 also has at least a first state and a second state. The first state of the TES switch 532 is operable to couple the conductor 542 to at least one of the transmitter electrodes segments 310 comprising one of the transmitter electrodes 510. The second state of the TES switch 532 is operable to decouple the connection (i.e., open) between conductor 542 and the transmitter electrodes segments 310, while coupling the at least two of the transmitter electrodes segments 310 comprising one of the transmitter electrodes 810. For example in the first state, the TES switch 532 decouples at least two of the transmitter electrode segments 310 of the transmitter electrode 510, shown in FIG. 5 as transmitter electrodes segment $310_1$ decoupled from transmitter electrodes segment $310_2$ of the first transmitter electrode $510_1$, while coupling the first transmitter electrode $510_1$ to the sensor module 205 through the conductor 542. In the second state, the TES switch 532 connects the at least two of the transmitter electrode segments 310 of the transmitter electrode 510 while decoupling the first transmitter electrode 510-1 from the conductor 542 and hence the sensor module 205.

The DDC and TES switches 532, 530 may be a transistor or other solid state switching device. The state of the DOC and TES switches 532, 530 may be controlled via a signal from the processing system 110 and/or a host processor of the electronic system.

In operation, the states of the DDC and TES switches 532, 530 may be selected to better configure the sensor electrodes 215, and more specifically the transmitter electrodes 510, for a particular type of capacitive sensing. In a first example, the states of the DDC and TES switches 532, 530 may be selected to couple less than all the segments 310 comprising one of the transmitter electrodes 510 to the sensor module 205 to enable a first type of capacitive sensing to be performed. In embodiments wherein the first type of capacitive sensing is an absolute sensing routine, the reduced plan area of the selected segments 310 relative to the plan area of the transmitter electrode 510 when having all segments 310 coupled together allows for more robust capacitive sensing as the capacitive load on the segments 310 of the transmitter electrodes 510 being utilized is reduced. As the segments 310 still intersect with the receiver electrodes 320 defining an array of capacitive pixels, the absolute sensing may be utilized to perform absolute capacitance sensing in both X and Y directions. Moreover, since absolute sensing allows more robust detection of input objects that are hovering in the sensing region 120, the first type of capacitive sensing, when configured for an absolute sensing routine, is particularly suitable for use in low power modes, such as when the input device 100 is in a sleep mode and is periodically looking in the sensing region 120 for an indication that a wake-up signal or gesture is being performed.

The segments 310 of the transmitter electrodes 510 and the receiver electrodes 320 not being utilized for the absolute capacitance sensing routine may be driven with a substantially constant voltage, electrically floated, or driven with a varying voltage or guard signal. For example, the absolute capacitance sensing routine may scan through the plurality of transmitter electrodes 510 and the receiver electrodes 320 to obtain information indicative of input in the sensing region 120 at each capacitive pixel, while providing a substantially constant voltage, electrically floating or driving with a varying voltage or guard signal on the sensor electrodes 320, 510 not comprising the capacitive pixel being addressed to obtain input information.

In a second example, the states of the DDC and TES switches 532, 530 may be selected to couple all the segments 310 comprising one of the transmitter electrodes 510 to the sensor module 205 to enable a second type of capacitive sensing to be performed. In embodiments wherein the second type of capacitive sensing is a transcapacitive sensing routine, the large plan area of the transmitter electrodes 510 relative to the small plan area of the receiver electrodes 320 allows for robust capacitive sensing in both the X and Y directions, including in instances where more than one input object is present in the sensing region 120. Moreover, the second type of capacitive sensing configured as a transcapacitive sensing routine permits detection of wake-up gestures and codes, making the second type of capacitive sensing complimentary for determining if the input device 100 should fully wake and exit a low power mode, or if the input device 100 should return to a low power state, e.g., a sleep mode, and revert to performing a less power consuming type of capacitive sensing, such as absolute sensing.

In a third example, the DDC and TES switches 532, 530 may be in a third state. In the third state, the DDC and TES switches 532, are disposed in a state selected to couple one of the segments 310 comprising a selected transmitter electrode 510 to the display driver module 210 and to couple a different one of the segments 310 comprising the selected transmitter electrodes 510 to the sensor module 205 to enable a third type of capacitive sensing to be performed, for example, a transcapacitive sensing routine.

In another embodiment of the third example in which the DDC and TES switches 532, 530 are disposed in a state selected to couple one of the segments 310 comprising a selected transmitter electrode 510 to the display driver module 210 and to couple a different one of the segments 310 comprising the selected transmitter electrodes 510 to the sensor module 205, the segments 310 are of the same plan area. Thus, the switches 532, 530 allow connection of an electrode in Vcom layer (i.e., the transmitter electrode 510) to either the display driver module 210 or the sensor module 205 to enable an absolute sensing routine or a transcapacitive sensing routine either as selected by a host processor or in response to detection of an input object in the sensing region 120.

The ability of the processing system 110 to switch between different types of capacitive sensing techniques enables the input device 100 to more accurately detect the presence of one or more input objects in the sensing region 120 by appropriately applying the capacitive sensing technique most suitable for the type of input event. Moreover, ability of the processing system 110 to switch between different types of capacitive sensing techniques enables the input device 100 to more efficiently manage power consumption by utilizing the capacitive sensing technique that consumes the least amount of power, then switching to a more power consuming capacitive sensing technique only when the type of input event requires. Furthermore, the ability of the processing system 110 to change the size of the sensor electrodes 320, 510 utilized for different types of capacitive sensing techniques enables the input device 100 to more accurately detect the presence of one or more input objects in the sensing region 120 by reducing the capacitive load on the sensor electrodes 320, 510 when utilized for certain types of capacitive sensing techniques.

Figure 6:
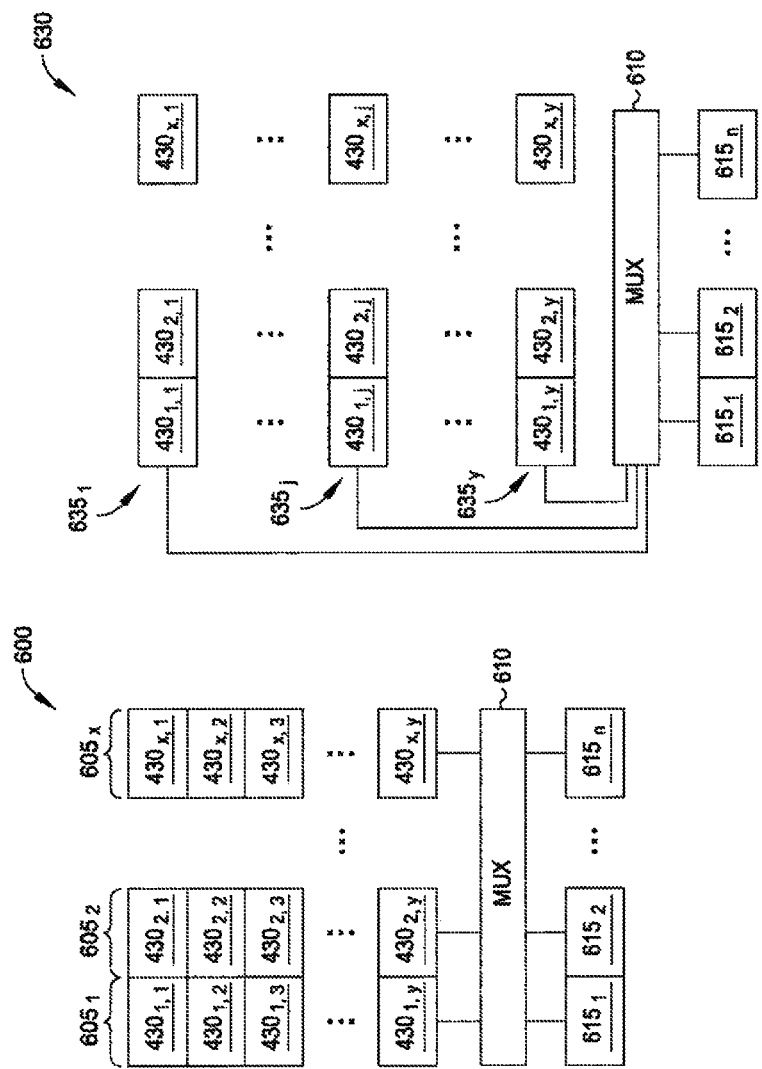
FIG. 6 illustrates arrangements including an exemplary pattern of sensor electrodes for performing active input sensing, according to embodiments described herein.

Next, FIG. 6 illustrates arrangements 600, 630 including an exemplary pattern of sensor electrodes 430, according to one embodiment. Arrangements 600 and 630 represent an adaptation of FIG. 4 that is capable of performing active input sensing. Although not shown, the arrangements 600, 630 may include one or more grid electrodes disposed between and/or around various sensor electrodes 430, as well as various other components.

Generally, the multiplexer 610 may be included as part of the sensor module 205 of the processing system 110, and is used to group one or more sensor electrodes 430 into discrete sensing channels $615_{1-n}$. As shown in arrangement 600, in a first mode the sensor electrodes 430 may be grouped into a plurality of columns $605_1$-$605_x$, where each column 605 may be sensed by a sensing channel 615. In one embodiment, the output of each sensor electrode 430 in a particular column 605 is coupled together, so that the group of sensor electrodes 430 behaves as a larger sensor electrode 430. In one embodiment, the number of columns 605 ($x$) equals the number of sensing channels 615 ($n$), so that the columns and sensing channels correspond in a 1:1 ratio. In another embodiment, the number of columns 605 is greater than the number of sensing channels 615, and the multiplexer 610 may cycle through the columns 605 in a time sequence (e.g., connecting different columns 605 to sensing channels 615 at different times).

As shown in arrangement 630, in a second mode the sensor electrodes 430 may be grouped into a plurality of rows $635_1$-$635_y$, where each row 635 may be sensed by a sensing channel 615. In one embodiment, the output of each sensor electrode 430 in a particular row 635 is coupled together, so that the group of sensor electrodes 430 behaves as a larger sensor electrode 630. In one embodiment, the number of rows 635 ($y$) equals the number of sensing channels 615 ($n$), so that the rows and sensing channels correspond in a 1:1 ratio. In another embodiment, the number of rows 635 is greater than the number of sensing channels 615, and the multiplexer 610 may cycle through the rows 635 in a time sequence (e.g., connecting different rows 635 to sensing channels 615 at different times).

In one embodiment, the sensor electrodes 430 may be operated according to the first and/or second modes to detect a presence of an active input device consistent with descriptions provided herein. The operation may include using the first and/or second modes to resolve positional information of the active input device along one or more dimensions. In one embodiment, the processing system 110 periodically alternates between operation in the first and second modes. In one embodiment, the active input device may be tracked after positional information is determined. For example, a number of samples may be taken from a select subset of sensor electrodes 430 of the arrangement 600, 630 based on an earlier determined position of the active input device. In one embodiment, one or more columns 605 and/or one or more rows 635 proximate to the determined active input device position may be selected and operated in a subsequent sensing cycle. Of course, the number may vary based on a number of factors, such as resolution of the position, current or anticipated movement of the active input device, etc.

Exemplary Timing Considerations for Display and Sensing

Figure 7:
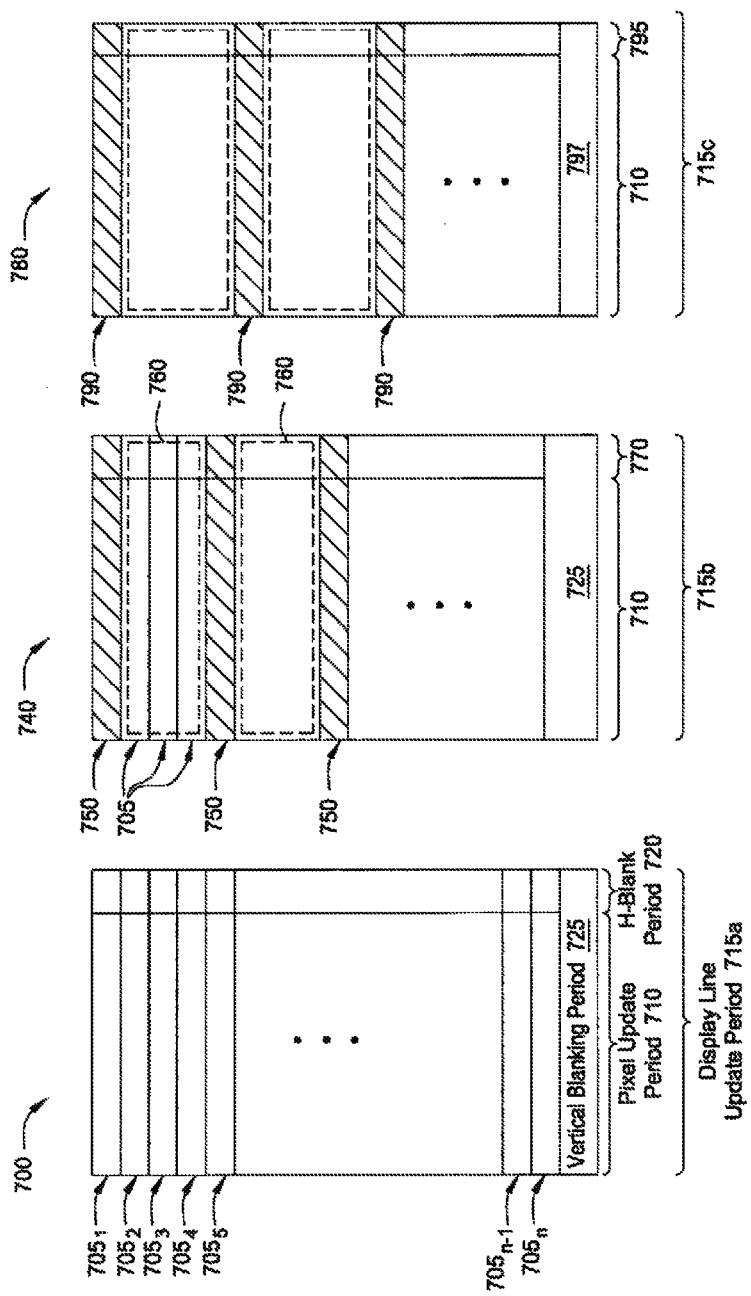
FIG. 7 illustrates timing charts for display frames, according to embodiments described herein.

FIG. 7 illustrates timing charts for display frames, according to one embodiment. The timing charts illustrate the different time periods used within display frames 700, 740, 780, and illustrate example timings in which display driver module 210 drives display electrodes 220 for performing display updates. Generally, the area of the timing charts represents the amount of time required to update a display. While intervals and timing included within each of the display frames 700, 740, 780 may vary, the areas of each display frame may be assumed to be the same. For example, maintaining a 60 hertz (Hz) frame rate results in a frame time of 16.67 milliseconds (ms).

The display line update periods 715($a$-$c$) each represents the amount of time used to update a single display line 705 of a display screen in an input device, such as the input device 100. The display line update period 715 is further divided into a pixel update period 710, and a buffering period called a horizontal blanking period 720, or "h-blank." During this and other buffering periods, the display driver generally does not update display pixels. Instead, the display driver may use the buffering periods to retrieve data for updating a next display line, to allow signal settling, to receive interference signals, change gate selection and so forth. In various embodiments, the pixel update period 710 may be held substantially constant while the line update period may be changed, which may be beneficial for reducing display artifacts.

In some embodiments, display frames 700, 740, 780 may include various additional buffering periods. For example, display frames 700, 740, 780 each include a vertical blanking period 725 (or "v-blank") that generally occurs between the last display line update period of one frame and the first display line update period of a next frame. Display frames 740, 780 also include one or more in-frame blanking periods 750, 790 (also called "long horizontal blanking," "long h-blank," "distributed blanking," etc.).

While the timing charts of FIG. 7 generally illustrate display updating information, capacitive sensing may occur contemporaneously with the display updating. The long horizontal blanking periods 750 may be separated by periods of combined capacitive sensing or interference sensing and display updating 760, during which a number of display lines 705 are updated. In some embodiments, the capacitive sensing and display updating signals may be synchronized to improve capacitive sensing performance. Of course, capacitive sensing may also occur during the various buffering periods, even though no display updating is occurring.

The length and timing of the buffering periods may be selected based on display and/or sensing performance, as well as computing requirements. The display update periods and rates may be modified along with capacitive sensing rates to avoid sources of interference. However, display data may still be provided to the input device at a constant rate (even though the display line update rate may change), or at least at a rate that differs from the display update rate. In order to preserve all the display data for accurate display, a buffer for the display data must be appropriately sized to support a maximum difference between the rate the data is provided to the input device and the rate that the data is displayed (or the host pixel rate and the display pixel rate, respectively). For example, if the display update period increases by 10% corresponding to a changed frequency of a capacitive sensing signal, the size of the buffer should be at least 10% of the data of a full display frame.

In one embodiment, the time for v-blank period 725 may be appropriately sized so that display data may be retrieved from the buffer once per display frame. In various embodiments, this allows changing the line rate associated with display line update period 715$a$. However, a relatively large amount of memory would be needed for the buffer in this case.

In another embodiment, long horizontal blanking periods 750 may be used to retrieve data from the buffer. As a result, the buffer size may be significantly smaller. For example, say sixteen (16) long horizontal blanking periods are included per display frame. If buffer data is retrieved during each long horizontal blanking period, the buffer size may be selected to be as small as $\frac{1}{16}$th of the maximum pixel rate difference. In some cases, the buffer size may be less than one percent of the display frame data; however, other percentages may also be used. Of course, other numbers of blanking periods and the times when buffer data is retrieved may be selected. In another example, data may be retrieved from the buffer a number of times per display frame that is less than the number of long horizontal blanking periods.

By adding long horizontal blanking periods or dynamically adjusting their size, other adjustments may need to be made to maintain the required time for updating each display frame (i.e., the constant area of display frames 700, 740, 780). In display frame 780, a larger long horizontal blanking period 790 is selected than the long horizontal blanking period 750 of display frame 740. To maintain the total amount of display update time, the size of other buffering periods may be appropriately adjusted (e.g., to allow 715$b$ to change to 715$c$). As shown, h-blank period 795 and v-blank period 797 are smaller than their counterparts in display frame 740 to compensate for the larger long horizontal blanking periods 790. Of course, the various buffering periods may be adjusted differently; one buffering period could be decreased while another period remains the same or is even increased.

In some embodiments, the location of the long horizontal blanking periods may be dithered between different display frames. When long horizontal blanking periods occur at fixed times in the display update period, the display updates correspondingly pause at the same spatial locations on the display screen (say, the same display line) over multiple frames. Any problems that occur with displaying pixels near the paused locations may be propagated over several frames (e.g., visual display artifacts). By dithering the blanking periods, even where display errors occur in one frame, the errors may be less perceptible to a viewer, or may be corrected more quickly when display data for a subsequent frame is driven.

Figure 8:
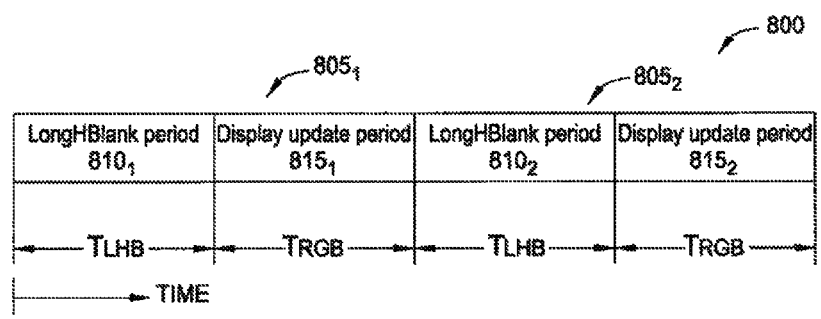
FIGS. 8, 9, 10, 11A, and 11B illustrate timing diagrams including periods for input sensing and display updating, according to embodiments described herein.

FIG. 8 illustrates a timing diagram including periods for input sensing and display updating, according to one embodiment. Generally, timing diagram 800 illustrates input sensing during one or more long horizontal blanking periods of an associated display device. Some input devices may be capable of performing continuous sampling of an active input device signal, that is, detecting input signals and decoding the information contained therein contemporaneously with performing display updating. However, in certain hardware implementations of an input device, it may be preferable to separate time periods for input sensing from time periods for display updating. For example, this may be the case with input devices that use common sensor electrodes that are used for both input sensing and display updating.

An active input device, such as an active pen, typically emits an active input signal that has been modulated using a selected fundamental frequency ($F_{active}$). To recover the information contained within the modulated active input signal, processing system 110 may include a sensing frequency ($F_{sense}$), which is combined with the modulated active input signal to adjust frequency components of the detected active input signal to fall within a suitable frequency range. After applying the sensing frequency, the information is available at a difference frequency (or "beat frequency" $F_{beat}$) that is processed by an analog to digital converter (ADC). For example, if the $F_{active}$ is 112.5 kilohertz (kHz), the sensing frequency $F_{sense}$ could be selected as 110 kHz to produce a beat frequency $F_{beat}$ of 2.5 kHz (i.e., 112.5 kHz–110 kHz) which falls within the processing capabilities of the ADC.

In FIG. 8, two display cycles $805_1$, $805_2$ are illustrated that each include a separate long horizontal blanking period (LongHBlank period 810) of duration $T_{LHB}$ and display update period 815 of duration $T_{RGB}$. In some embodiments, during LongHBlank period 810 the processing system performs input sensing (active and/or passive) and during display update period 815, the processing system does not perform sensing. Each bit of information that is included in the active input signal is transmitted over a bit period represented by $T_{bit}$. Generally, a number of signal samples (each having a sample period represented by $T_{ADC}$) will be taken by the ADC to sense the information included in the active input signal.

Performing active input sensing during discrete long horizontal blanking periods (instead of continuous sensing implementation) imposes various timing constraints, as much less time is generally available for performing sensing. In one embodiment, the product of the number of samples N and the period of each display cycle (i.e., $T_{LHB}+T_{RGB}$) is less than or equal to the bit period $T_{bit}$. In one embodiment, the sample period $T_{ADC}$ is less than or equal to the period of each display cycle (i.e., $T_{LHB}+T_{RGB}$). Understanding such timing constraints, better sensing performance may generally be obtained by increasing the sensing frequency $F_{sense}$ in order to perform more sensing cycles within the same amount of time (e.g., during a particular LongH-Blank period 810).

As discussed above, the active input device generally transmits an active input signal at a selected fundamental frequency ($F_{active}$). In some embodiments, the active input signal also includes frequency components at other harmonics (i.e., integer multiples of $F_{active}$). For example, a square wave generally includes odd harmonic components (i.e., at $n*F_{active}$, where n=1, 3, 5, ...). The amplitude of each odd harmonic is approximately 1/n of the amplitude of the signal at the fundamental frequency.

Therefore, in some embodiments, the active input signal is sensed at a harmonic frequency that is greater than the fundamental frequency, and the sensing frequency $F_{sense}$ is selected to provide a corresponding beat frequency $F_{beat}$ that is suitable for sampling by the ADC. In some embodiments, the sensed harmonic is selected based on signal-to-noise ratio (SNR) measurements or other measures of relative signal strength at the particular harmonic frequency. In one embodiment, the active input signal is sensed at a third harmonic (i.e., $3*F_{active}$). In one embodiment, the active input signal is sensed at a fifth harmonic (i.e., $5*F_{active}$). In one embodiment, the harmonics are dynamically selected and/or updated based on signal strength. Sensing at harmonic frequencies may be especially beneficial for implementations in which the properties of the active input device are not controlled by the input device that receives the active input signal. For example, these techniques may establish compatibility for a particular input device with third-party active input devices.

Continuing the earlier example, a third harmonic of the active input signal is sensed (i.e., $3*F_{active}$=337.5 kHz) by the input device. Accordingly, to maintain a desired beat frequency of 2.5 kHz for the ADC, the sensing frequency $F_{sense}$ may be selected to be 337.5 kHz–2.5 kHz=335 kHz, which corresponds to a sensing period of approximately 2.99 μs. In this example, the ADC samples at a frequency of 10 kHz, so that sample period $T_{ADC}$ is 100 microseconds (μs). Accordingly, the period of each display cycle (i.e., $T_{LHB}+T_{RGB}$) is less than 100 μs. Assuming that the non-sensing display update period $T_{RGB}$ requires 60 μs, the amount of time available for sensing during $T_{LHB}$ is approximately 40 μs. This amount of time supports thirteen full sensing cycles (40 μs/2.99 μs=13.4 cycles) within one long horizontal blanking period, which provides sensing performance that is comparable to implementations using separate sensing hardware for the active input device.

Alternatively, in some implementations, one or more properties of the active input device may be controlled based by the input device. In one embodiment, the fundamental frequency for the active input signal may be selected based on the timing of active input sensing supported by the input device (e.g., based on long horizontal blanking periods 810 and display update periods 815). For example, the fundamental frequency of the active input signal may be selected as an integer multiple of the original $F_{active}$, such as $3*F_{active}$. In this case, the signal strength at a frequency $F=3*F_{active}$ is about three times (3x) greater than a third harmonic of the original $F_{active}$, but the active input device consumes additional power to generate the signal. In one embodiment, the input device controls the operation of the active input device based on signal strength. For example, the input device may sense a harmonic frequency of the active input signal during a first, low-power mode of operation, but in another mode the input device controls the active input device to transmit the active input signal at an increased frequency. In one embodiment, the frequency sensed by the input device is approximately the same in both modes. In one embodiment, the modes may be selected or updated based on measured sensing performance. For example, the input device determines that the SNR at the sensed frequency has decreased to a certain level due to noise, and in response the frequency of the active input signal is increased to improve SNR at the sensed frequency.

Figure 9:
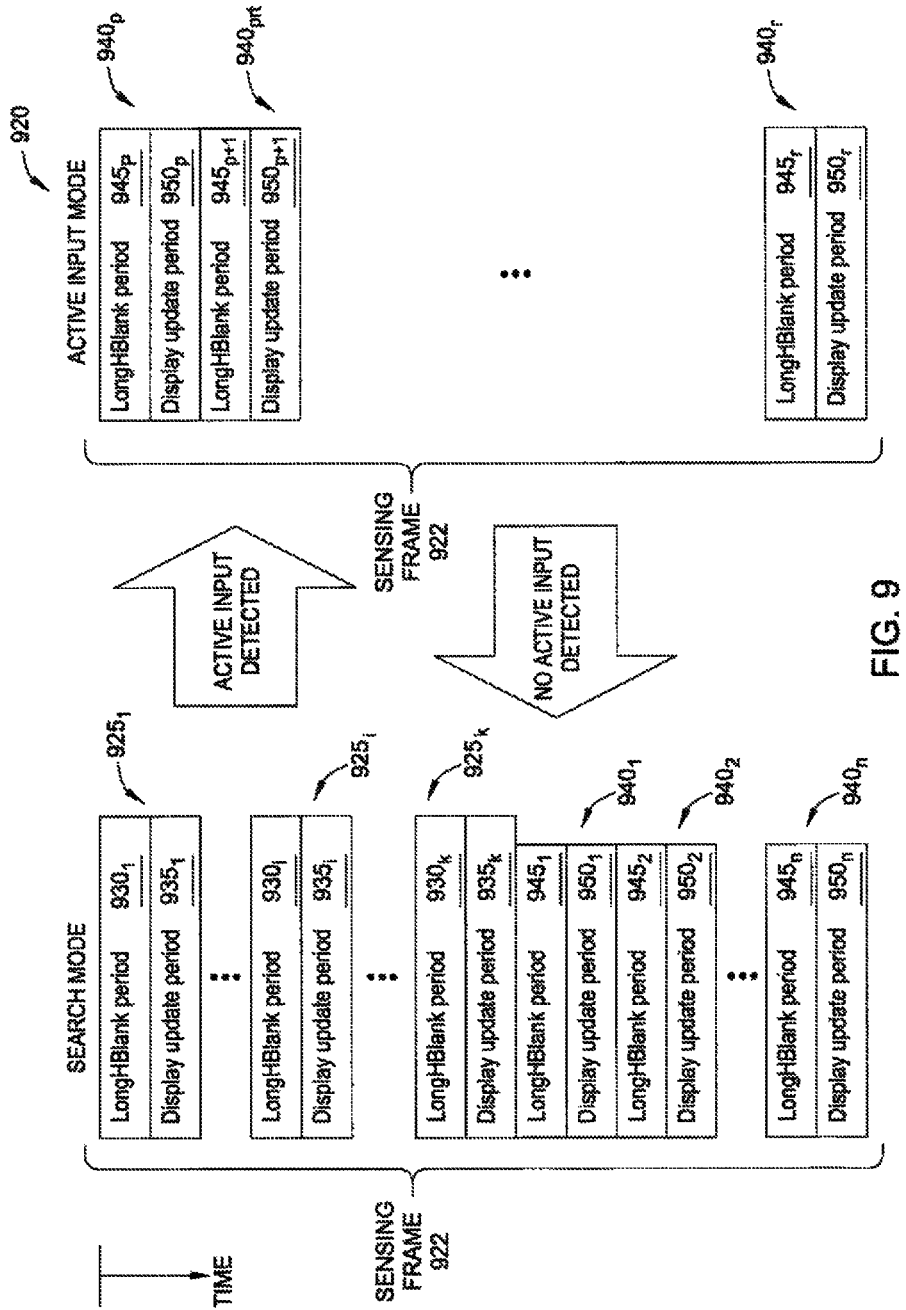

FIG. 9 illustrates a timing diagram including periods for input sensing and display updating, according to one embodiment. Generally, timing diagram 920 illustrates input sensing during one or more long horizontal blanking periods of an associated display device, and shows modes of operation of the input device 100 (or processing system 110) to support active input sensing.

In a first mode of operation ("search mode") and within a first sensing frame 922, the input device 100 receives display updates during one or more display cycles $925_1$-$925_k$ and one or more display cycles $940_1$-$940_n$. Each display cycle 925, 940 includes a LongHBlank period 930 or 945 and a display update period 935 or 950. Generally, the lengths of LongHBlank periods 930, 945 may be the same or different, and the lengths of display update periods 935, 950 may be the same or different.

In the search mode, the input device 100 performs passive input sensing and/or noise sensing during the LongHBlank periods 930, and performs active input sensing during the LongHBlank periods 945. The LongHBlank periods 930 may be longer than LongHBlank periods 945 reflecting longer time requirements for capacitive sensing and/or shorter time requirements at a desired frequency for active sensing. In one embodiment, the numbers and lengths of each type of LongHBlank periods 930, 945 within sensing frame 922 may be selected to optimize passive input and/or active input sensing performance. In one embodiment, the number of LongHBlank periods 945 included in sensing frame 922 may be the same as the number of ADC samples N. In one embodiment, the LongHBlank periods $945_{1-n}$ are not interleaved with any LongHBlank periods 930. In one embodiment, the number of LongHBlank periods 945 included in the sensing frame 922 for active input sensing is less than the number of LongHBlank periods 930 for passive input sensing (e.g., when the active input device is not detected).

Generally, the input device 100 in the search mode is configured to detect an active input signal from an active input device while performing touch and/or noise sensing measurements within the same sensing frame. As will be discussed further below, detecting the active input signal may include performing phase and/or frequency estimates for signals received during the LongHBlank periods $945_{1-n}$, as well as determining adequate signal strength (e.g., SNR) by comparing against a threshold value. After detecting the active input signal during LongHBlank periods 945, operation of the input device changes to a separate active input mode.

In a second mode of operation (the "active input mode") and within a second sensing frame 952, the input device 100 performs active input sensing during one or more display cycles $940_p$-$940_r$. Each display cycle 940 includes a LongHBlank period 945 and a display update period 950. Generally, the active input mode reflects that an active input signal has been detected from an active input device.

In some embodiments, the active input mode sensing frame 952 includes an increased number of periods for performing active input sensing (LongHBlank periods 945) than are included in the search mode sensing frame 922. In one embodiment, the sensor module of the processing system 110 is configured to select a number of LongHBlank periods 945 for a subsequent sensing frame 952 that is larger than the number of LongHBlank periods 945 of the current sensing frame 922 upon detecting the presence of the active input device. The increased number of LongHBlank periods 945 for active input sensing may generally improve the sensing performance of the input device. In one embodiment, the sensing frame 952 includes active input sensing periods exclusively, with no periods allotted for passive input or noise sensing. In another embodiment (not shown), the sensing frame 952 includes one or more LongHBlank periods 930 for passive input or noise sensing, in addition to the increased number of LongHBlank periods 945 for active input sensing. In one embodiment, the composition and/or proportion of LongHBlank periods 930, 945 within a sensing frame 952 may be selected or updated based on measured active and/or passive sensing performance. For example, an increased number of LongHBlank periods 945 may be included in sensing frames 952 where the measured SNR of the active input signal is lower than a threshold value. The composition and/or proportion of LongHBlank periods 930, 945 within sensing frames 952 may also be dynamically updated. For example, if the SNR of the active input signal decreases over one or more sensing frames 952, the input device 100 may responsively increase the number or proportion of LongHBlank periods 945 within subsequent sensing frames. Ultimately, the input device 100 may revert to operation in the search mode when the active input device is no longer detected (e.g., SNR decreases below a threshold value).

Figure 10:
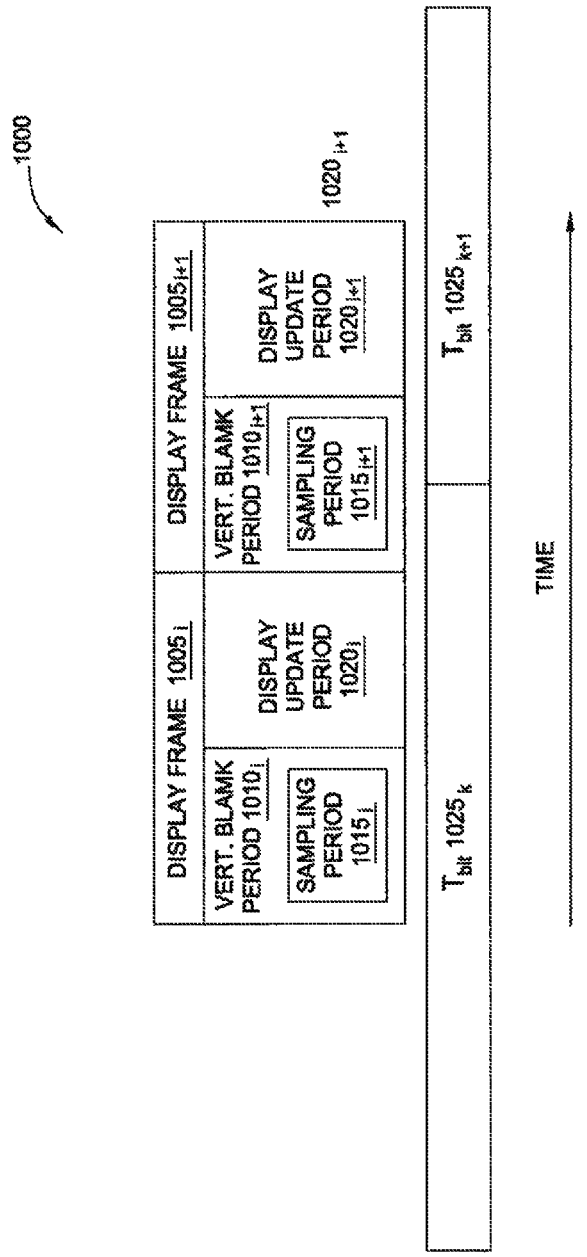

FIG. 10 illustrates a timing diagram including periods for input sensing and display updating, according to one embodiment. Generally, timing diagram 1000 illustrates input sensing during one or more vertical blanking periods of an associated display device.

As discussed above, vertical blanking periods generally occur once per display frame, between a last display line update period of a first frame and a first display line update period of a subsequent frame. Within timing diagram 1000, each display frame 1005 includes a vertical blanking period 1010 and a display update period 1020. As some implementations of the input device 100 use common hardware (e.g., sensor electrodes) for performing display updating and active input sensing, it may be advantageous to perform input sensing separately from display updating periods. Thus, each vertical blanking period 1010 includes a sampling period 1015 during which active input sensing may be performed. In one embodiment, only active input sensing is performed during the vertical blanking period 1010. In some embodiments, passive input sensing and/or noise sensing may also be performed during the vertical blanking period 1010 and/or during the display update period 1020.

Establishing a communication channel between the active input device and the input device 100 is described in greater detail below. To maintain the communication channel without losing data transmitted from the active input device, the bit period $T_{bit}$ 1025 should be greater than or equal to two times the period of display frame 1005, that is, two times the sum of vertical blanking period 1010 and display update period 1020.

As with other embodiments, the frequency of the active input signal sensed by the input device 100 during the sampling periods 1015 may be a fundamental frequency of the active input device ($F_{active}$) or a selected harmonic of the fundamental frequency. The sensed frequency may be selected based on the length of time available for sensing during the sampling periods 1015, sensing performance at different frequencies (e.g., based on presence of noise), and so forth. Likewise, the sensing frequency $F_{sense}$ may be selected to provide a desired beat frequency $F_{beat}$ that is suitable for ADC measurements. In some embodiments, the sampling periods 1015 for active input sensing are included in the display frames 1005 regardless of whether the presence of the active input device is sensed.

Figure 11:
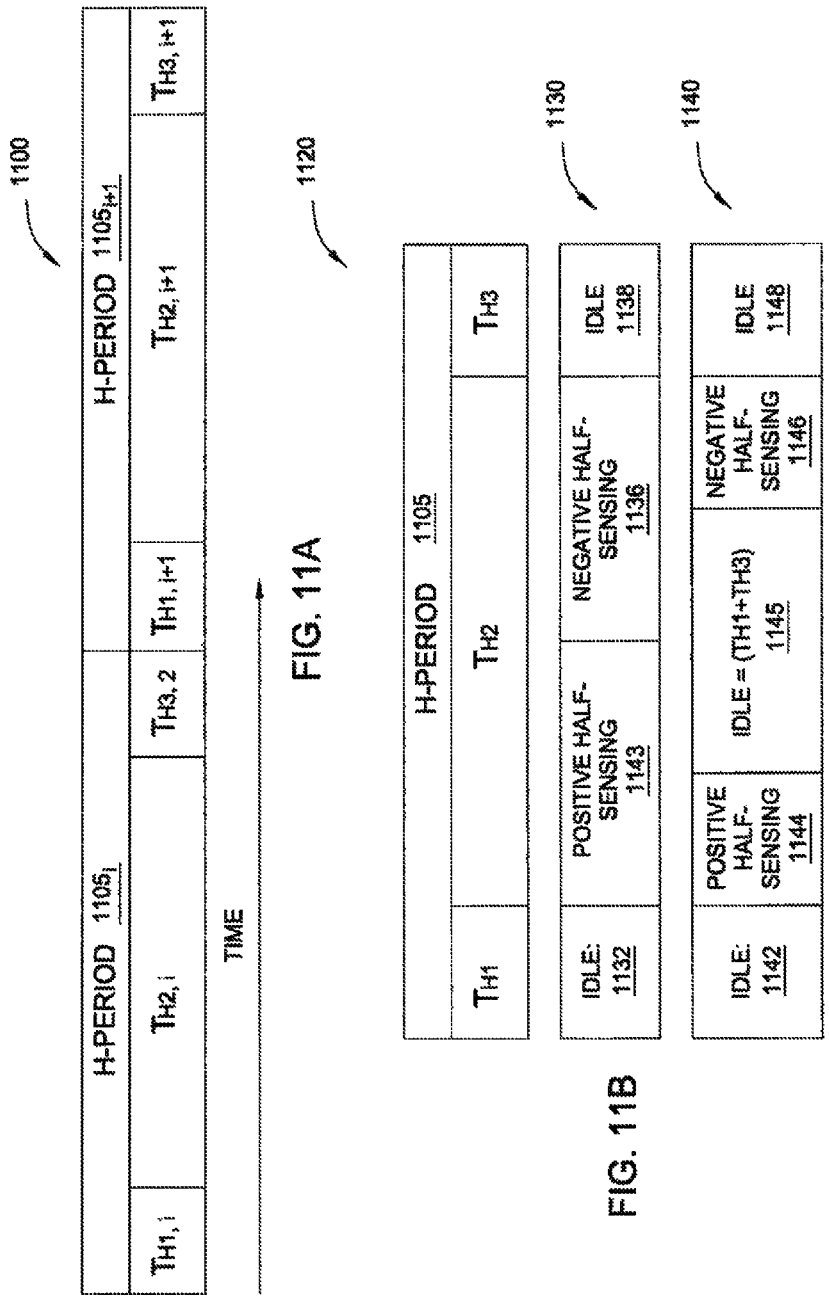

FIGS. 11A and 11B illustrate timing diagrams including periods for input sensing and display updating, according to one embodiment. Generally, timing diagrams 1100 and 1120 illustrate input sensing synchronized to a horizontal display line of an associated display device.

In one embodiment, input sensing (active, passive, and/or noise sensing) may be performed during discrete horizontal blanking periods that are generally included within each display line update period. In other embodiments, the timing of a display line update period may be divided into one or more portions, and input sensing selectively performed during one or more of the portions. In these embodiments, the portion lengths may be selected based on noise characteristics or other properties (e.g., a shared processor or other circuitry is unavailable due to performing another function, such as display updating) that may affect an ability to perform input sensing. As shown, timing diagram 1100 includes two consecutive H-periods $1105_i$, $1105_{i+1}$, each of which includes periods $T_{H1}$, $T_{H2}$, and $T_{H3}$. The period $T_{H1}$ represents a first portion H1 of the display line update period H-period 1105. During the first portion H1, a significant amount of noise may be received by a sensor electrode due to the concurrent driving of display signals for updating a display device. In some cases, the amount of noise caused by the driven display signals may cause H1 to be unsuitable for performing active input sensing (e.g., too low a SNR). In one embodiment, first portion H1 is not used for performing input sensing.

Period $T_{H2}$ represents a second portion H2 of the H-period 1105 and follows the first portion H1. Generally, the noise present during H1 may be decreased or absent, so that H2 may be suitable for performing active input sensing. In some embodiments, input sensing is performed during the H2 portion. In one embodiment, one or more half-sensing periods are allocated within each H2.

Period $T_{H3}$ represents a third portion H3 of the H-period 1105 and follows the second portion H2. Generally, H3 represents a time margin that may be utilized by the input device 100 for accommodating variations in the timing for driving sensing and display signals, as well as performing transitions in sensing and/or display circuitry (e.g., updates to multiplexing circuitry). In one embodiment, the horizontal blanking period of the H-period 1105 falls within the portion H3.

The timing diagram 1120 illustrates exemplary timing for performing input sensing. Sensing plot 1130 includes an idle period 1132 corresponding to the H1 portion of the H-period 1105, during which no input sensing is performed by the input device 100. Sensing plot 1130 also includes a positive half-sensing period 1134 and a negative half-sensing period 1136 corresponding to the H2 portion, and another no-input sensing idle period 1138 corresponding to the H3 portion. In some embodiments, sensing cycles of the input device 100 are each divided into two half cycles (e.g., positive half-sensing period 1134 and negative half-sensing period 1136).

However, in some cases, the timing configuration shown in timing diagram 1120 may introduce more than one frequency component of the sensing frequency, which in turn causes more than one beat frequency to occur. This could reduce the power of the signal at the desired beat frequency for sampling by the ADC, reducing sensing performance and possibly making the signal unsuitable for active input device sensing.

Similar to the sensing plot 1120, sensing plot 1140 includes an idle period 1142 corresponding to H1, a positive half-sensing period 1144 and a negative half-sensing 1146 within the period $T_{H2}$ corresponding to H2, and an idle period 1148 corresponding to H3. However, the sensing plot 1140 also includes an additional idle period 1145 within $T_{H2}$ between the positive half-sensing period 1144 and the negative half-sensing period 1146. In one embodiment, the lengths of positive half-sensing period 1144, negative half-sensing period 1146, and idle period 1145 are selected so that substantially only one sensing frequency component is provided for generating the beat frequency. In one embodiment, the lengths of positive half-sensing period 1144 and negative half-sensing period 1146 are substantially equal. In one embodiment and as shown, the length of idle period 1175 is the sum of the lengths of $T_{H1}$ and $T_{H3}$. Thus, over multiple H-periods 1105, each consecutive sensing period (whether positive or negative) is separated by the same time period (i.e., $T_{H1}+T_{H3}$). Such consistent timing reduces the number of frequency components that are included in the sensing frequency, so that a single beat frequency may be generated for sampling by the ADC.

Exemplary Hardware Adaptations for Active Input Sensing

Figure 12:
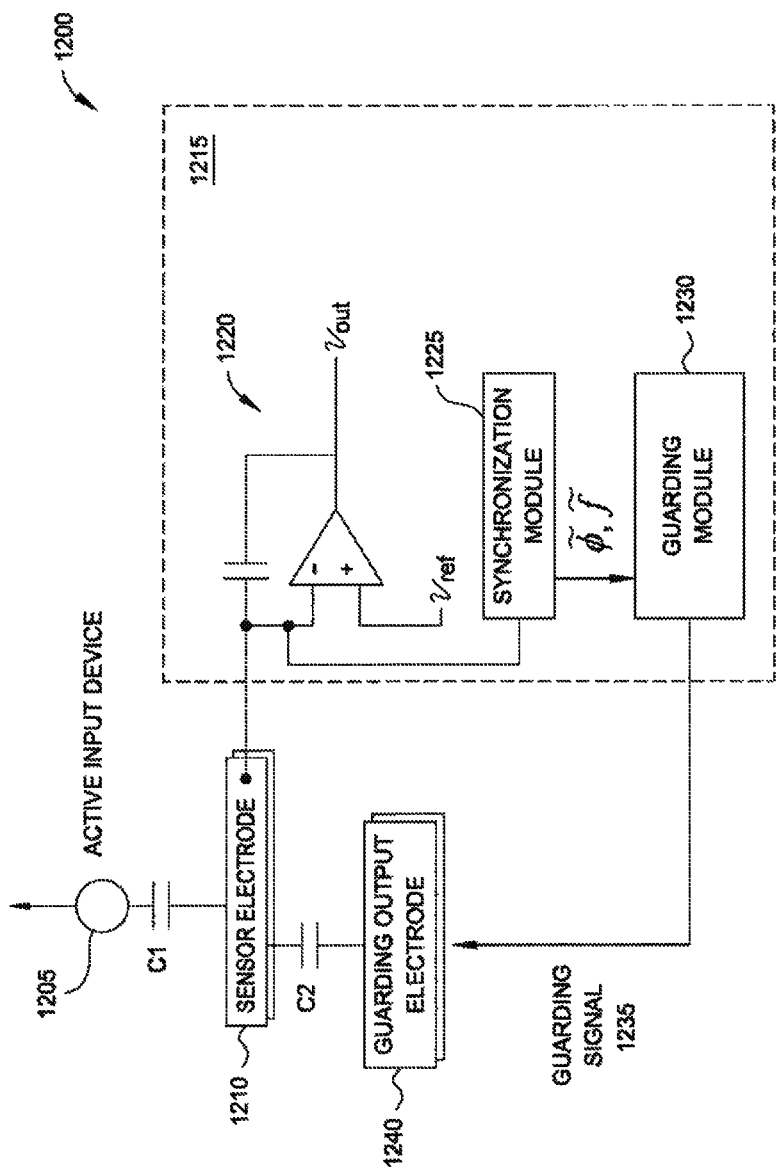
FIG. 12 illustrates an exemplary configuration for performing active input sensing using a synchronization module, according to embodiments described herein.

FIG. 12 illustrates an exemplary configuration for performing active input sensing using a synchronization module, according to one embodiment. As shown, arrangement 1200 includes an active input device (represented by a voltage source 1205) that is capacitively coupled with (e.g., through capacitance C1) a sensor electrode 1210. The sensor electrode 1210 may generally include any of the sensor electrodes 215 of various configurations described above, such as sensor electrodes 310, 320, 430. In turn, the sensor electrode 1210 is coupled with circuitry 1215, which in some cases may be included as part of the sensor module 205 of the processing system 110. In one embodiment, the circuitry 1215 may be included in a discrete integrated circuit for input sensing.

The circuitry 1215 includes an integrator 1220, synchronization module 1225 and a guarding module 1230. During operation of the active input device, an active input signal may be received by the sensor electrode 1210. The active input signal is received at one input terminal of the integrator 1020, while the other input terminal is connected with a reference voltage $V_{ref}$. In some embodiments, the circuitry 1215 maintains a constant reference voltage for the sensor electrode 1210. When the active input signal is received at the sensor electrode 1210, the charge included in the signal modifies the voltage of the sensor electrode 1210 and the circuitry 1215 integrates the charge at integrator 1020 to determine the amount of charge or current that is required to return the sensor electrode from the output voltage $V_{out}$ to the reference voltage $V_{ref}$.

Thus, the settling time associated with the sensor electrode 1210 affects the ability of the processing system 110 to measure the received active input signal. Generally, if the settling time exceeds approximately half the period of the active input signal, a reduced amplitude of the active input signal may be measured by the processing system, adding inaccuracies and decreasing sensing performance. Reducing settling time becomes more important as the sensed frequency of the active input device increases (e.g., sampling harmonics of the active input signal, as is described herein).

In some embodiments, the settling time may be represented by τ=R*C, where R is the resistance of the sensor electrode and C is the capacitance of the sensor electrode. Reducing the capacitance of the sensor electrode may be accomplished through a number of approaches, some of which have been discussed above with respect to FIG. 8. One example includes sub-segmenting electrodes that have high capacitive loading, and using one or more sub-segments to sense the active input signal. Another example includes, during periods of input sensing, electrically floating conductors that are coupled with the sensor electrode, such as electrodes used as gate or source lines for display updating.

In one embodiment, signal guarding techniques may also be used to improve the settling time of the sensor electrode 1210. However, to generate an appropriate guarding signal, the circuitry may be required to synchronize with the frequency and/or phase of the received active input signal. The synchronization module 1225 includes active and/or passive hardware elements that operate according to known techniques to estimate a phase φ and frequency f of the received active input signal. The estimated phase φ and frequency f are then output to the guarding module 1230, which generates a guarding signal 1235 having approximately the same phase and frequency as the active input signal. In some embodiments, the guarding signal is not modified based on the timing of sensing periods.

The guarding module 1230 is coupled with a guarding output electrode 1240 that is also capacitively coupled with (e.g., through capacitance C2) the sensor electrode 1210. The guarding output electrode 1240 may include one or more of the sensor electrodes 215 that are disposed within proximity of the sensor electrode 1210. In other words, when driven with guarding signal 1235 (or any other electrical signal), the guarding output electrode 1240 is able to cause electrical effects on the sensor electrode 1210 such as shielding the sensor electrode 1210 from other electrical effects and effectively reducing capacitance C1.

Figure 13:
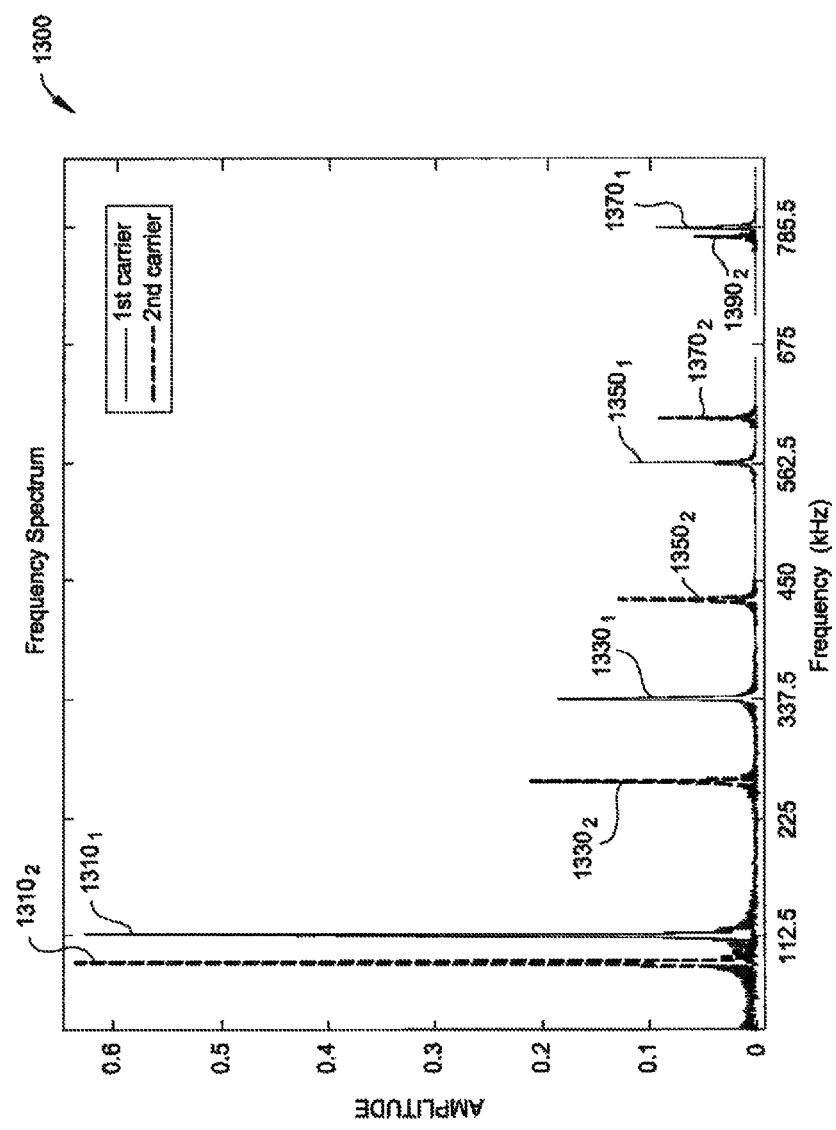
FIG. 13 illustrates plots of exemplary first and second carrier signals used for an active input device, according to embodiments described herein.

FIG. 13 illustrates plots of exemplary first and second carrier signals used for an active input device, according to one embodiment. The active input device may be configured to select one of the carrier signals based on environmental conditions, such as avoiding noise or interfering sources. The first carrier signal has a fundamental frequency at approximately 112.5 kHz (peak 1310$_1$), a third harmonic at 337.5 kHz (3*112.5 kHz; peak 1330$_1$), a fifth harmonic at 562.5 kHz (5*112.5 kHz; peak 1350$_1$), and a seventh harmonic at 787.5 kHz (7*112.5 kHz; peak 1370$_1$). The second carrier signal has a fundamental frequency at approximately 85.5 kHz (peak 1310$_2$), a third harmonic at 256.5 kHz (peak 1330$_2$), a fifth harmonic at 427.5 kHz (peak 1350$_2$), a seventh harmonic at 787.5 kHz (peak 1370$_2$), and a ninth harmonic at 769.5 kHz (peak 1390$_2$).

As discussed above, a sensor electrode's settling time may affect the amplitude of a measured signal from an active input device. For sensor electrodes that are not specifically configured to sense at particular harmonic(s) of the active input signal, which may be the case when accommodating third-party active input devices, the sensitivity of the sensor electrode may be decreased significantly when operated to sense at a harmonic. Such sensitivity may be reflected in a diminished hover height for the active input device, that is, the active input device must be closer to the sensor electrodes to couple with the sensor electrodes. For example, the amplitudes at harmonic peaks 1330-1390 are significantly decreased from the amplitude at the fundamental frequency (peak 1310). In some embodiments, the processing system 110 may select an operating frequency (corresponding to one of the peaks 1310-1390) based on noise or interference measurements (or SNR) and a desired sensitivity of the active input device.

Figure 14:
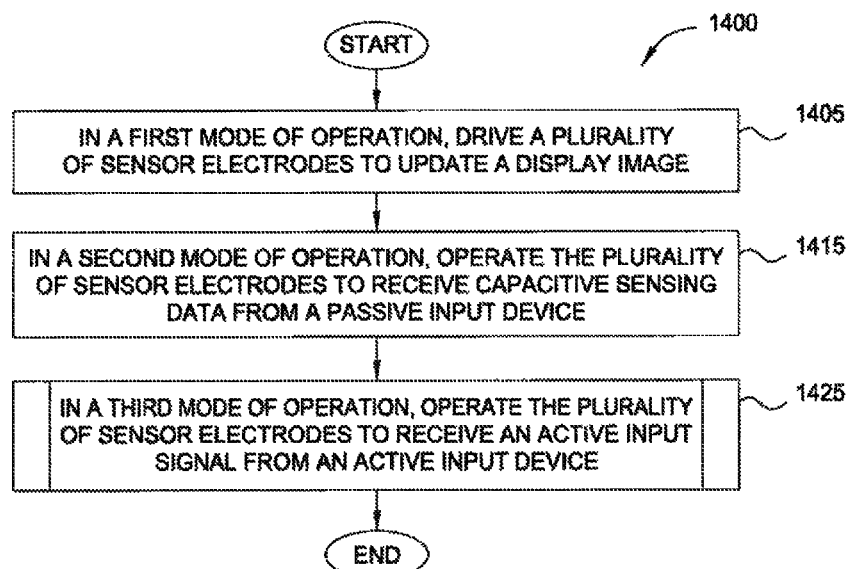
FIGS. 14 and 15 illustrate methods of operating a plurality of sensor electrodes to perform input sensing and display updating, according to embodiments described herein.

FIG. 14 illustrates a method 1400 of operating a plurality of sensor electrodes to perform input sensing and display updating, according to one embodiment. Method 1400 may generally be used by the processing system 110 of an input device 100 using any of the various implementations of sensor electrodes described above. Additionally, it is contemplated that the relatively brief description of method 1400 may be complemented by various features and techniques that are described in greater detail above.

Method 1400 includes, at block 1405 and in a first mode of operation of the processing system 110, driving a display signal onto a plurality of sensor electrodes to update a display image. At block 1415 and in a second mode of operation, the processing system 110 operates the plurality of sensor electrodes to receive capacitive sensing data from a passive input device. At block 1425 and in a third mode of operation, the processing system 110 operates the plurality of sensor electrodes to receive an active input signal from an active input device. In one embodiment, the processing system may select differing numbers of periods for active input sensing within a sensing frame based on the mode. In one embodiment, the processing system includes a greater number of active input sensing periods in a sensing frame when operating in the third mode than when operating in the second mode, generally improving the active input sensing performance of the processing system.

In some embodiments, selected ones of the blocks 1405-1425 may be performed at separate times, at partially overlapping times, and/or simultaneously. The timing of performing passive and/or active input sensing may be based on display timing requirements. In some cases, the input sensing may correspond to discrete time periods within a display update periods, such as blanking periods where no display updating occurs.

Figure 15:
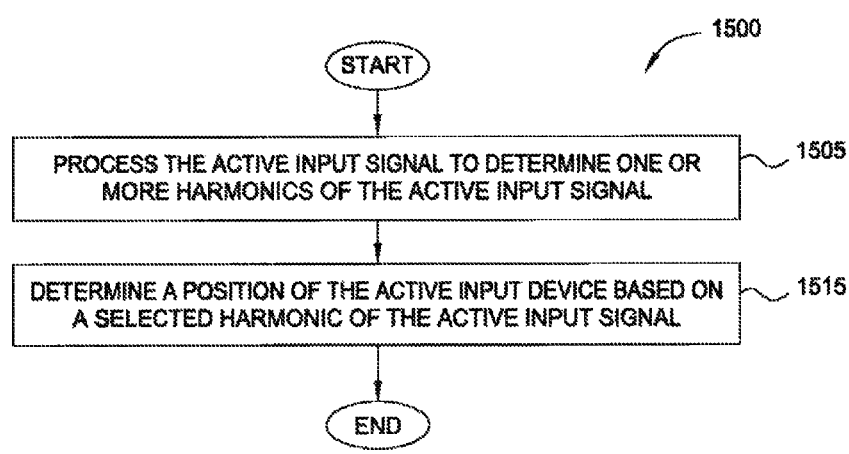

FIG. 15 illustrates a method 1500 of operating a plurality of sensor electrodes to perform input sensing and display updating, according to one embodiment. Method 1500 may be performed as part of block 1425 above. At block 1505, the processing system 110 processes the received active input signal to determine one or more harmonics of the fundamental frequency of the active input signal. The processing system 110 may perform any known type of signal analysis and processing suitable for determining the harmonics, which may include measuring harmonic component frequencies directly or measuring a fundamental frequency and multiplying the result to determine a particular harmonic.

At block 1515, the processing system 110 (e.g., using a determination module 415) determines a position of the active input device based on a selected harmonic of the active input signal. The harmonic may be selected based on a number of different factors that affect sensing performance, such as noise or interference levels at certain frequencies and/or the timing available for active input sensing within sensing windows (e.g., within a display update period). In some embodiments, the selected harmonic may be an odd harmonic (i.e., 3d, 5th, 7th, etc.). In one embodiment, the processing system 110 operates the sensor electrodes to sense at the selected harmonic. In another embodiment, the processing system 110 communicates with the active input device to increase the fundamental frequency of the active input signal to a value that would have been a harmonic of the original fundamental frequency.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A processing system, comprising:
a sensor module configured to communicate with a plurality of sensor electrodes, wherein the sensor module is configured to:
   operate, in a first mode of operation, the plurality of sensor electrodes to receive a first active input from an active input device, wherein operating the plurality of sensor electrodes to receive a first active input comprises:
      selecting a higher harmonic of an active input signal received from the active input device, and
      selecting, based on the higher harmonic, a sensing frequency for demodulating the active input signal, and
   operate, in a second mode of operation, the plurality of sensor electrodes to receive capacitive sensing data for a passive input from a passive input device; and
a determination module configured to determine positional information for the active input device based on the demodulated active input signal.

2. The processing system of claim 1, further comprising:
a display module configured to drive display signals onto the plurality of sensor electrodes for updating a display,
wherein the sensor module is further configured to:
   operate, in the second mode of operation, the plurality of sensor electrodes to receive a second active input from the active input device, wherein receiving the second active input comprises:
      receiving, during a first plurality of non-display update periods within a first sensing frame, the active input signal from the active input device,
      wherein receiving capacitive sensing data for a passive input occurs during a second, different plurality of non-display update periods within the first sensing frame.

3. The processing system of claim 2, wherein a first number of periods of the first plurality of non-display update periods within the first sensing frame is greater than a second number of periods of the second plurality of non-display update periods.

4. The processing system of claim 2, wherein the sensor module is further configured to:
select, upon detecting a presence of the active input device during the first sensing frame, a first number of periods for a third plurality of non-display update periods for receiving the active input signal during a second, subsequent sensing frame,
   wherein the first number of periods is greater than a second number of periods of the first plurality of non-display update periods within the first sensing frame.

5. The processing system of claim 2, wherein each of the first plurality of non-display update periods and the second plurality of non-display update periods comprises long horizontal blanking periods.

6. The processing system of claim 1, wherein the higher harmonic of the active input signal is a third harmonic of the active input signal.

7. The processing system of claim 1, wherein the sensor module is further configured to:
acquire one or more measurements of signal strength of the active input signal; and
transition between the first mode and the second mode based on the one or more measurements of signal strength.

8. The processing system of claim 7, wherein selecting a higher harmonic of the active input signal is based on the one or more measurements of signal strength.

9. The processing system of claim 1, wherein the sensor module is further configured to:
instruct the active input device to adjust a frequency of the active input signal to the higher harmonic.

10. The processing system of claim 9, wherein the sensor module is further configured to:
acquire one or more measurements of signal strength of the active input signal; and
determine, based on the one or more measurements of signal strength, whether to instruct the active input device to adjust the frequency of the active input signal to the higher harmonic.

11. The processing system of claim 1, further comprising:
a display module configured to drive display signals onto the plurality of sensor electrodes for updating a plurality of display lines during a plurality of display line update periods,
wherein the sensor module is further configured to:
   during a first portion of a display line update period, not perform input sensing;
   during a second portion of the display line update period, perform input sensing, wherein the second portion occurs after the first portion; and
   during a third portion of the display line update period, not perform input sensing, wherein the third portion occurs after the second portion.

12. The processing system of claim 11, wherein the second portion of the display line update period comprises:
a fourth portion occurring after the first portion, wherein the sensor module is further configured to sense a positive half-cycle of a first sensing cycle during the fourth portion;
a fifth portion occurring after the fourth portion, wherein the sensor module is configured to not perform input sensing during the fifth portion; and
a sixth portion occurring after the fifth portion, wherein the sensor module is further configured to sense a negative half-cycle of the first sensing cycle during the sixth portion,
wherein lengths of the fourth portion, fifth portion, and sixth portion are selected such that the sensing frequency comprises substantially only one sensing frequency component.

13. An input device, comprising:
a plurality of sensor electrodes; and
a processing system configured to:
   operate, in a first sensing mode, the plurality of sensor electrodes to receive capacitive sensing data for a passive input from a passive input device, operate, in a second sensing mode, the plurality of sensor electrodes to receive a first active input from an active input device, wherein operating the plurality of sensor electrodes to receive a first active input comprises:
  selecting a higher harmonic of an active input signal received from the active input device, and
  selecting, based on the higher harmonic, a sensing frequency for demodulating the active input signal, and
determine positional information for the active input device based on the demodulated active input signal.

14. The input device of claim 13, wherein the processing system is further configured to:
  drive display signals onto the plurality of sensor electrodes for updating a display; and
  operate, in the first sensing mode, the plurality of sensor electrodes to receive a second active input from the active input device, wherein receiving the second active input comprises:
    receiving, during a first plurality of non-display update periods within a first sensing frame, the active input signal from the active input device,
  wherein receiving capacitive sensing data for a passive input occurs during a second, different plurality of non-display update periods included within the first sensing frame.

15. The input device of claim 14, wherein a first number of periods of the first plurality of non-display update periods within the first sensing frame is greater than a second number of periods of the second plurality of non-display update periods.

16. The input device of claim 14, wherein the processing system is further configured to:
  select, upon detecting a presence of the active input device during the first sensing frame, a first number of periods for a third plurality of non-display update periods for receiving the active input signal during a second, subsequent sensing frame,
  wherein the first number of periods is greater than a second number of periods of the first plurality of non-display update periods within the first sensing frame.

17. The input device of claim 13, wherein the higher harmonic of the active input signal is a third harmonic of the active input signal.

18. A method, comprising:
  operating, in a first sensing mode, a plurality of sensor electrodes to receive capacitive sensing data for a passive input from a passive input device;
  operating, in a second sensing mode, the plurality of sensor electrodes to receive a first active input from an active input device, wherein operating the plurality of sensor electrodes to receive a first active input comprises:
    selecting a higher harmonic of an active input signal received from the active input device, and
    selecting, based on the higher harmonic, a sensing frequency for demodulating the active input signal; and
  determining positional information for the active input device based on the demodulated active input signal.

19. The method of claim 18, further comprising:
  driving display signals onto a plurality of sensor electrodes for updating a display; and
  operating, in the first sensing mode, the plurality of sensor electrodes to receive a second active input from the active input device, wherein receiving the second active input comprises:
    receiving, during a first plurality of non-display update periods within a first sensing frame, the active input signal from the active input device,
  wherein receiving capacitive sensing data for a passive input occurs during a second, different plurality of non-display update periods included within the first sensing frame.

20. The method of claim 19, further comprising:
  selecting, upon detecting a presence of the active input device during the first sensing frame, a first number of periods for a third plurality of non-display update periods for receiving the active input signal during a second, subsequent sensing frame,
  wherein the first number of periods is greater than a second number of periods of the first plurality of non-display update periods within the first sensing frame.

* * * * *